(12) United States Patent
Tsutsumi et al.

(10) Patent No.: US 7,505,213 B2
(45) Date of Patent: Mar. 17, 2009

(54) ZOOM LENS AND IMAGE PICKUP APPARATUS

(75) Inventors: Katsuhisa Tsutsumi, Saitama (JP); Nobuaki Toyama, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 0 days.

(21) Appl. No.: 11/889,142

(22) Filed: Aug. 9, 2007

(65) Prior Publication Data
US 2008/0037136 A1 Feb. 14, 2008

(30) Foreign Application Priority Data
Aug. 10, 2006 (JP) .............................. 2006-217945

(51) Int. Cl.
G02B 15/14 (2006.01)
(52) U.S. Cl. ...................... 359/684; 359/686
(58) Field of Classification Search ................. 359/676, 359/683, 684, 686–688
See application file for complete search history.

(56) References Cited

U.S. PATENT DOCUMENTS 5,760,967 A 6/1998 Terasawa et al.
6,512,637 B1 1/2003 Tomita

FOREIGN PATENT DOCUMENTS

| JP | 55057815 A | * | 4/1980 |
| JP | 38 02 725 A1 | | 8/1988 |
| JP | 7-151966 A | | 6/1995 |
| JP | 3495772 B2 | | 11/2003 |
| JP | 2003-344766 A | | 12/2003 |

* cited by examiner

Primary Examiner—William C Choi
(74) Attorney, Agent, or Firm—Birch, Stewart, Kolasch & Birch, LLP

(57) ABSTRACT

A focusing group G1 is disposed on an object side relative to a variator group G2. The focusing group G1 includes, in order from the object side, a first group G11 having a positive refractive power, a second group G12 having a positive refractive power, and a third group G13 having a positive refractive power. The first group G11 has, in order from the object side, at least one concave lens (L11) and at least one convex lens. When focusing from an infinitely distant object to a close object, the second group G12 and the third group G13 are moved so that with respect to a change in an object distance, an amount of movement of the second group G12 becomes large in a region near infinity, while an amount of movement of the third group G13 becomes large in a close range.

21 Claims, 28 Drawing Sheets

EXAMPLE 1

FIG. 1  EXAMPLE 1

FIG. 2 EXAMPLE 2

FIG. 3 EXAMPLE 3

EXAMPLE 4

EXAMPLE 5

FIG. 9

| | | EXAMPLE 1 BASIC LENS DATA<br>(f=8.76~127.04, FNo.=1.95~2.20, 2ω=67.9° ~4.90° ) | | | |
|---|---|---|---|---|---|
| | | Si | Ri | Di | Ndi | νdj |
| G1 | G11 | 1 | -150.655 | 2.25 | 1.80609 | 33.3 |
| | | 2 | 143.272 | 1.72 | 1.00000 | |
| | | 3 | 183.214 | 11.57 | 1.43387 | 95.1 |
| | | 4 | -136.058 | 0.12 | 1.00000 | |
| | | 5 | -7278.792 | 5.41 | 1.43387 | 95.1 |
| | | 6 | -185.992 | 0.12 | 1.00000 | |
| | | 7 | 168.725 | 6.65 | 1.43387 | 95.1 |
| | | 8 | -769.053 | 6.87 | 1.00000 | |
| | G12 | 9 | 96.134 | 10.15 | 1.49700 | 81.5 |
| | | 10 | -270.179 | 1.53 | 1.00000 | |
| | G13 | 11 | 53.720 | 6.02 | 1.71299 | 53.8 |
| | | 12 | 102.744 | D12 (VARIABLE) | 1.00000 | |
| G2 | | 13 | 94.307 | 0.80 | 1.88299 | 40.7 |
| | | 14 | 15.192 | 4.60 | 1.00000 | |
| | | 15 | -997.607 | 0.78 | 1.81600 | 46.6 |
| | | 16 | 37.791 | 1.68 | 1.00000 | |
| | | 17 | -1572.923 | 7.08 | 1.76182 | 26.5 |
| | | 18 | -12.147 | 1.00 | 1.78800 | 47.3 |
| | | 19 | 142.057 | 0.12 | 1.00000 | |
| | | 20 | 27.898 | 4.59 | 1.51454 | 54.6 |
| | | 21 | -67.126 | 1.00 | 1.88299 | 40.7 |
| | | 22 | 1438.535 | D22 (VARIABLE) | 1.00000 | |
| G3 | | 23 | -25.917 | 0.83 | 1.75699 | 47.8 |
| | | 24 | 28.996 | 3.38 | 1.80517 | 25.4 |
| | | 25 | -2974.259 | D25 (VARIABLE) | 1.00000 | |
| | | 26 | STOP | 1.25 | 1.00000 | |
| G4 | | 27 | 216.029 | 4.45 | 1.66672 | 48.3 |
| | | 28 | -36.163 | 0.12 | 1.00000 | |
| | | 29 | 62.448 | 8.17 | 1.51680 | 64.2 |
| | | 30 | -27.830 | 1.10 | 1.88299 | 40.7 |
| | | 31 | -97.940 | 35.08 | 1.00000 | |
| | | 32 | -85.475 | 4.91 | 1.48749 | 70.2 |
| | | 33 | -30.827 | 1.00 | 1.00000 | |
| | | 34 | 174.865 | 5.13 | 1.48749 | 70.2 |
| | | 35 | -32.217 | 1.10 | 1.83480 | 42.7 |
| | | 36 | -291.621 | 1.01 | 1.00000 | |
| | | 37 | 135.420 | 5.82 | 1.49700 | 81.5 |
| | | 38 | -27.359 | 1.10 | 1.83400 | 37.1 |
| | | 39 | -98.513 | 0.12 | 1.00000 | |
| | | 40 | 47.733 | 4.50 | 1.51680 | 64.2 |
| | | 41 | -111.709 | 5.00 | 1.00000 | |
| GP | | 42 | ∞ | 33.00 | 1.60863 | 46.6 |
| | | 43 | ∞ | 13.20 | 1.51633 | 64.0 |
| | | 44 | ∞ | 10.06 | 1.00000 | |

| EXAMPLE 1 SURFACE DISTANCE DURING ZOOMING | | | |
|---|---|---|---|
| f | D12 | D22 | D25 |
| 8.76 | 1.00 | 43.63 | 8.49 |
| 35.04 | 31.41 | 10.06 | 11.66 |
| 127.04 | 43.45 | 5.27 | 4.41 |

| EXAMPLE 1 AMOUNT OF FOCUSING MOVEMENT | | |
|---|---|---|
| OBJECT DISTANCE | $\delta 2$ | $\delta 3$ |
| 3.00m | 2.27 | 0.98 |
| 1.82m | 3.05 | 1.92 |
| 1.40m | 3.53 | 2.69 |
| 0.75m | 6.11 | 5.39 |

FIG. 12

| | | EXAMPLE 2 BASIC LENS DATA | | | |
|---|---|---|---|---|---|
| | | (f=10.10~222.15, FNo.=2.04~2.26, 2ω=58.2°~2.80°) | | | |
| | | Si | Ri | Di | Ndi | νdj |
| G1 | G11 | 1 | 366.209 | 2.80 | 1.80099 | 35.0 |
| | | 2 | 123.491 | 1.25 | 1.00000 | |
| | | 3 | 122.522 | 13.29 | 1.43387 | 95.1 |
| | | 4 | -1924.328 | 0.20 | 1.00000 | |
| | | 5 | 268.771 | 6.23 | 1.43387 | 95.1 |
| | | 6 | 8506.967 | 7.78 | 1.00000 | |
| | G12 | 7 | 132.018 | 10.72 | 1.43387 | 95.1 |
| | | 8 | -6208.128 | 1.50 | 1.00000 | |
| | G13 | 9 | 85.694 | 11.25 | 1.49700 | 81.5 |
| | | 10 | 275.184 | D10 (VARIABLE) | 1.00000 | |
| G2 | | 11 | 343.634 | 1.20 | 1.88299 | 40.7 |
| | | 12 | 17.813 | 6.38 | 1.00000 | |
| | | 13 | -50.856 | 3.79 | 1.80809 | 22.8 |
| | | 14 | -22.973 | 1.00 | 1.81600 | 46.6 |
| | | 15 | 83.710 | 0.10 | 1.00000 | |
| | | 16 | 36.080 | 3.14 | 1.80809 | 22.8 |
| | | 17 | 176.450 | D17 (VARIABLE) | 1.00000 | |
| G3 | | 18 | -40.232 | 1.00 | 1.69350 | 53.2 |
| | | 19 | 47.312 | 3.04 | 1.80517 | 25.4 |
| | | 20 | 371.883 | D20 (VARIABLE) | 1.00000 | |
| | | 21 | STOP | 1.25 | 1.00000 | |
| G4 | | 22 | 419.655 | 4.25 | 1.62041 | 60.3 |
| | | 23 | -45.892 | 0.12 | 1.00000 | |
| | | 24 | 84.464 | 3.39 | 1.57099 | 50.8 |
| | | 25 | -226.730 | 0.12 | 1.00000 | |
| | | 26 | 45.901 | 7.58 | 1.48749 | 70.2 |
| | | 27 | -49.159 | 1.30 | 1.80099 | 35.0 |
| | | 28 | 87.384 | 43.00 | 1.00000 | |
| | | 29 | 507.519 | 4.01 | 1.62004 | 36.2 |
| | | 30 | -53.814 | 1.40 | 1.00000 | |
| | | 31 | 32.786 | 5.74 | 1.48749 | 70.2 |
| | | 32 | -104.371 | 1.70 | 1.83480 | 42.7 |
| | | 33 | 26.103 | 2.01 | 1.00000 | |
| | | 34 | 31.674 | 7.47 | 1.49700 | 81.5 |
| | | 35 | -28.199 | 1.70 | 1.83480 | 42.7 |
| | | 36 | 1213.373 | 0.34 | 1.00000 | |
| | | 37 | 50.608 | 6.76 | 1.54072 | 47.2 |
| | | 38 | -46.983 | 5.00 | 1.00000 | |
| GP | | 39 | ∞ | 33.0 | 1.60863 | 46.6 |
| | | 40 | ∞ | 13.20 | 1.51633 | 64.0 |
| | | 41 | ∞ | 7.93 | 1.00000 | |

| EXAMPLE 2 SURFACE DISTANCE DURING ZOOMING | | | |
|---|---|---|---|
| f | D10 | D17 | D20 |
| 10.10 | 1.50 | 89.74 | 4.12 |
| 50.49 | 60.81 | 20.88 | 13.68 |
| 222.15 | 82.29 | 8.24 | 4.83 |

| EXAMPLE 2 AMOUNT OF FOCUSING MOVEMENT | | |
|---|---|---|
| OBJECT DISTANCE | $\delta 2$ | $\delta 3$ |
| 9.60m | 3.39 | 0.86 |
| 5.00m | 6.81 | 1.59 |
| 3.41m | 7.09 | 3.41 |
| 2.20m | 6.78 | 6.83 |

FIG. 15

| | | EXAMPLE 3 BASIC LENS DATA $(f=9.41 \sim 517.77, FNo.=1.76 \sim 2.53, 2\omega=63.4° \sim 1.20°)$ | | | |
|---|---|---|---|---|---|
| | | Si | Ri | Di | Ndi | νdj |
| G1 | G11 | 1 | 638.523 | 3.96 | 1.83400 | 37.1 |
| | | 2 | 254.662 | 2.00 | 1.00000 | |
| | | 3 | 252.534 | 26.83 | 1.43387 | 95.1 |
| | | 4 | -1456.171 | 26.72 | 1.00000 | |
| | G12 | 5 | 373.347 | 9.02 | 1.43387 | 95.1 |
| | | 6 | 734.784 | 0.20 | 1.00000 | |
| | | 7 | 296.737 | 22.61 | 1.43387 | 95.1 |
| | | 8 | -1361.784 | 2.50 | 1.00000 | |
| | G13 | 9 | 170.674 | 19.07 | 1.43875 | 95.0 |
| | | 10 | 443.910 | D10 (VARIABLE) | 1.00000 | |
| G2 | | 11 | 1677.729 | 1.89 | 1.90365 | 31.3 |
| | | 12 | 67.473 | 6.87 | 1.00000 | |
| | | 13 | -217.280 | 1.85 | 1.88299 | 40.7 |
| | | 14 | 164.988 | 8.05 | 1.00000 | |
| | | 15 | -95.067 | 4.08 | 1.80809 | 22.8 |
| | | 16 | -56.023 | 1.80 | 1.83480 | 42.7 |
| | | 17 | -860.600 | 0.20 | 1.00000 | |
| | | 18 | 149.877 | 8.88 | 1.80809 | 22.8 |
| | | 19 | -58.945 | 1.80 | 1.80400 | 46.6 |
| | | 20 | 165.682 | D20 (VARIABLE) | 1.00000 | |
| G3 | | 21 | -1349.909 | 6.63 | 1.43875 | 95.0 |
| | | 22 | -114.970 | 0.18 | 1.00000 | |
| | | 23 | 893.991 | 6.47 | 1.56907 | 71.3 |
| | | 24 | -146.173 | 0.18 | 1.00000 | |
| | | 25 | 192.468 | 11.26 | 1.43875 | 95.0 |
| | | 26 | -97.792 | 2.02 | 1.80809 | 22.8 |
| | | 27 | -213.854 | 2.00 | 1.00000 | |
| | | 28 | 129.880 | 8.21 | 1.43875 | 95.0 |
| | | 29 | -266.034 | D29 (VARIABLE) | 1.00000 | |
| | | 30 | STOP | 8.83 | 1.00000 | |
| G4 | | 31 | -52.089 | 1.50 | 1.78830 | 47.4 |
| | | 32 | -34.821 | 12.49 | 1.80518 | 25.4 |
| | | 33 | -78.775 | 1.50 | 1.80400 | 46.6 |
| | | 34 | 139.329 | 19.73 | 1.00000 | |
| | | 35 | -100.118 | 6.28 | 1.51633 | 64.1 |
| | | 36 | -52.162 | 12.00 | 1.00000 | |
| | | 37 | 527.611 | 2.01 | 1.80517 | 25.4 |
| | | 38 | 65.315 | 1.75 | 1.00000 | |
| | | 39 | 63.320 | 10.21 | 1.51728 | 69.5 |
| | | 40 | -56.720 | 0.20 | 1.00000 | |
| | | 41 | 315.616 | 2.00 | 1.88299 | 40.7 |
| | | 42 | 44.811 | 9.50 | 1.51728 | 69.5 |
| | | 43 | -125.957 | 0.20 | 1.00000 | |
| | | 44 | 57.957 | 18.31 | 1.51823 | 58.9 |
| | | 45 | -212.220 | 0.00 | 1.00000 | |
| GP | | 46 | ∞ | 33.00 | 1.60863 | 46.6 |
| | | 47 | ∞ | 13.20 | 1.51633 | 64.1 |
| | | 48 | ∞ | 16.85 | 1.00000 | |

| EXAMPLE 3 SURFACE DISTANCE DURING ZOOMING | | | |
|---|---|---|---|
| f | D10 | D20 | D29 |
| 9.41 | 2.91 | 252.47 | 3.00 |
| 84.73 | 135.46 | 90.73 | 32.19 |
| 517.77 | 169.46 | 5.39 | 83.53 |

| EXAMPLE 3 AMOUNT OF FOCUSING MOVEMENT | | |
|---|---|---|
| OBJECT DISTANCE | $\delta 2$ | $\delta 3$ |
| 13.90m | 12.78 | 0.02 |
| 6.00m | 24.65 | 3.47 |
| 3.96m | 25.81 | 12.26 |
| 2.75m | 25.55 | 24.51 |

FIG. 18

| | EXAMPLE 4 BASIC LENS DATA (f=9.46~520.06, FNo.=1.76~2.56, 2ω=62.7° ~1.19°) | | | | |
|---|---|---|---|---|---|
| | Si | Ri | Di | Ndi | νdj |
| G1 / G11 | 1 | 779.421 | 3.96 | 1.80439 | 39.6 |
| | 2 | 248.485 | 2.00 | 1.00000 | |
| | 3 | 246.960 | 26.26 | 1.43387 | 95.1 |
| | 4 | -2118.435 | 0.20 | 1.00000 | |
| | 5 | 702.564 | 8.82 | 1.43387 | 95.1 |
| | 6 | 9380.444 | 26.37 | 1.00000 | |
| G12 | 7 | 273.726 | 24.65 | 1.43387 | 95.1 |
| | 8 | -1190.807 | 2.50 | 1.00000 | |
| G13 | 9 | 172.301 | 20.28 | 1.43875 | 95.0 |
| | 10 | 525.552 | D10 (VARIABLE) | 1.00000 | |
| G2 | 11 | 619.433 | 1.89 | 1.90365 | 31.3 |
| | 12 | 72.805 | 6.12 | 1.00000 | |
| | 13 | -321.580 | 1.85 | 1.88299 | 40.7 |
| | 14 | 122.426 | 8.87 | 1.00000 | |
| | 15 | -90.903 | 4.00 | 1.80809 | 22.8 |
| | 16 | -53.616 | 1.80 | 1.83480 | 42.7 |
| | 17 | -5710.884 | 0.20 | 1.00000 | |
| | 18 | 147.627 | 8.75 | 1.80809 | 22.8 |
| | 19 | -59.022 | 1.80 | 1.80400 | 46.6 |
| | 20 | 160.502 | D20 (VARIABLE) | 1.00000 | |
| G3 | 21 | -1273.820 | 6.21 | 1.43875 | 95.0 |
| | 22 | -122.512 | 0.18 | 1.00000 | |
| | 23 | 558.236 | 7.42 | 1.56907 | 71.3 |
| | 24 | -131.350 | 0.18 | 1.00000 | |
| | 25 | 178.337 | 11.19 | 1.43875 | 95.0 |
| | 26 | -100.837 | 2.02 | 1.80809 | 22.8 |
| | 27 | -243.752 | 2.00 | 1.00000 | |
| | 28 | 125.178 | 7.87 | 1.43875 | 95.0 |
| | 29 | -316.412 | D29 (VARIABLE) | 1.00000 | |
| | 30 | STOP | 8.73 | 1.00000 | |
| G4 | 31 | -52.157 | 1.50 | 1.78830 | 47.4 |
| | 32 | 33.258 | 11.39 | 1.80518 | 25.4 |
| | 33 | -90.486 | 1.50 | 1.80400 | 46.6 |
| | 34 | 124.629 | 18.72 | 1.00000 | |
| | 35 | -100.034 | 10.00 | 1.51633 | 64.1 |
| | 36 | -52.646 | 12.00 | 1.00000 | |
| | 37 | 543.262 | 2.01 | 1.80517 | 25.4 |
| | 38 | 65.506 | 1.76 | 1.00000 | |
| | 39 | 63.580 | 10.09 | 1.51728 | 69.5 |
| | 40 | -57.768 | 0.20 | 1.00000 | |
| | 41 | 207.495 | 2.00 | 1.88299 | 40.7 |
| | 42 | 45.938 | 12.07 | 1.51728 | 69.5 |
| | 43 | -123.363 | 0.20 | 1.00000 | |
| | 44 | 60.884 | 15.81 | 1.51823 | 58.9 |
| | 45 | -366.115 | 0.00 | 1.00000 | |
| GP | 46 | ∞ | 33.00 | 1.60863 | 46.6 |
| | 47 | ∞ | 13.20 | 1.51633 | 64.1 |
| | 48 | ∞ | 16.85 | 1.00000 | |

| EXAMPLE 4 SURFACE DISTANCE DURING ZOOMING | | | |
|---|---|---|---|
| f | D10 | D20 | D29 |
| 9.46 | 2.46 | 250.78 | 2.96 |
| 85.10 | 134.75 | 89.94 | 31.52 |
| 520.06 | 168.80 | 5.48 | 81.93 |

| EXAMPLE 4 AMOUNT OF FOCUSING MOVEMENT | | |
|---|---|---|
| OBJECT DISTANCE | $\delta 2$ | $\delta 3$ |
| 15.90m | 12.67 | −0.04 |
| 6.00m | 25.31 | 4.35 |
| 4.06m | 26.00 | 12.20 |
| 2.75m | 25.35 | 24.39 |

FIG. 21

| | Si | Ri | Di | Ndi | νdj |
|---|---|---|---|---|---|
| | EXAMPLE 5 BASIC LENS DATA (f=9.57~526.54, FNo.=1.76~2.54, 2ω=60.9°~1.17°) | | | | |
| G1 G11 | 1 | 521.401 | 3.96 | 1.82760 | 39.5 |
| | 2 | 260.781 | 2.00 | 1.00000 | |
| | 3 | 255.955 | 22.99 | 1.43387 | 95.1 |
| | 4 | 0.000 | 25.93 | 1.00000 | |
| G12 | 5 | 348.360 | 3.70 | 1.86258 | 41.3 |
| | 6 | 269.638 | 2.00 | 1.00000 | |
| | 7 | 272.287 | 20.31 | 1.43387 | 95.1 |
| | 8 | 3915.238 | 0.20 | 1.00000 | |
| | 9 | 259.958 | 21.65 | 1.43387 | 95.1 |
| | 10 | -90188.217 | 2.58 | 1.00000 | |
| G13 | 11 | 171.517 | 19.73 | 1.43875 | 95.0 |
| | 12 | 484.082 | D12 (VARIABLE) | 1.00000 | |
| G2 | 13 | 568.048 | 1.89 | 1.90365 | 31.3 |
| | 14 | 63.438 | 5.79 | 1.00000 | |
| | 15 | -432.088 | 1.85 | 1.88299 | 40.7 |
| | 16 | 80.210 | 9.43 | 1.00000 | |
| | 17 | -86.616 | 4.00 | 1.80809 | 22.8 |
| | 18 | -53.922 | 1.80 | 1.83480 | 42.7 |
| | 19 | -482.904 | 0.20 | 1.00000 | |
| | 20 | 138.541 | 9.14 | 1.80809 | 22.8 |
| | 21 | -55.997 | 1.80 | 1.80400 | 46.6 |
| | 22 | 182.401 | D22 (VARIABLE) | 1.00000 | |
| G3 | 23 | -2034.537 | 6.82 | 1.43875 | 95.0 |
| | 24 | -115.449 | 0.18 | 1.00000 | |
| | 25 | 553.017 | 7.61 | 1.56907 | 71.3 |
| | 26 | -129.708 | 0.18 | 1.00000 | |
| | 27 | 178.444 | 11.49 | 1.43875 | 95.0 |
| | 28 | -98.408 | 2.02 | 1.80809 | 22.8 |
| | 29 | -254.534 | 2.00 | 1.00000 | |
| | 30 | 120.901 | 8.36 | 1.43875 | 95.0 |
| | 31 | -283.048 | D31 (VARIABLE) | 1.00000 | |
| | 32 | STOP | 8.80 | 1.00000 | |
| G4 | 33 | -51.089 | 1.50 | 1.78830 | 47.4 |
| | 34 | 32.034 | 11.39 | 1.80518 | 25.4 |
| | 35 | -91.563 | 1.50 | 1.80400 | 46.6 |
| | 36 | 127.190 | 17.61 | 1.00000 | |
| | 37 | -95.265 | 10.00 | 1.51633 | 64.1 |
| | 38 | -53.160 | 12.00 | 1.00000 | |
| | 39 | 505.439 | 2.01 | 1.80517 | 25.4 |
| | 40 | 65.612 | 1.76 | 1.00000 | |
| | 41 | 63.278 | 10.11 | 1.51728 | 69.5 |
| | 42 | -56.322 | 0.20 | 1.00000 | |
| | 43 | 209.539 | 2.00 | 1.88299 | 40.7 |
| | 44 | 43.718 | 9.19 | 1.51728 | 69.5 |
| | 45 | -104.746 | 0.20 | 1.00000 | |
| | 46 | 64.166 | 14.70 | 1.51823 | 58.9 |
| | 47 | -393.602 | 0.00 | 1.00000 | |
| GP | 48 | ∞ | 33.00 | 1.60863 | 46.6 |
| | 49 | ∞ | 13.20 | 1.51633 | 64.1 |
| | 50 | ∞ | 16.83 | 1.00000 | |

| EXAMPLE 5 SURFACE DISTANCE DURING ZOOMING | | | |
|---|---|---|---|
| f | D12 | D22 | D31 |
| 9.57 | 2.46 | 238.61 | 2.82 |
| 86.16 | 127.20 | 85.97 | 30.71 |
| 526.54 | 159.01 | 5.59 | 79.30 |

| EXAMPLE 5 AMOUNT OF FOCUSING MOVEMENT | | |
|---|---|---|
| OBJECT DISTANCE | $\delta 2$ | $\delta 3$ |
| 13.03m | 12.37 | 0.02 |
| 6.00m | 24.00 | 2.25 |
| 3.89m | 25.00 | 11.07 |
| 2.75m | 24.74 | 22.14 |

FIG. 24A

| VALUES RELATING TO CONDITIONAL EXPRESSIONS | | | | | |
|---|---|---|---|---|---|
| COND. EXP. | EXAMPLE 1 | EXAMPLE 2 | EXAMPLE 3 | EXAMPLE 4 | EXAMPLE 5 |
| EXP. (1) | 0.357 | 0.125 | 0.001 | 0.002 | 0.001 |
| EXP. (2) | 0.422 | 0.045 | 0.010 | 0.026 | 0.011 |
| EXP. (3) | 0.06 | 0.13 | 0.02 | 0.09 | 0.03 |
| EXP. (4) | 0.44 | 0.40 | 0.59 | 0.49 | 0.59 |
| EXP. (5) | 1.04 | 0.82 | 1.44 | 1.11 | 1.44 |

FIG. 24B

| VALUES RELATING TO CONDITIONAL EXPRESSIONS | | | | | |
|---|---|---|---|---|---|
| COND. EXP. | EXAMPLE 1 | EXAMPLE 2 | EXAMPLE 3 | EXAMPLE 4 | EXAMPLE 5 |
| $Nd1$ | 1.80609 | 1.80099 | 1.83400 | 1.80439 | 1.82760 |
| $\nu d1$ | 33.3 | 35.0 | 37.1 | 39.6 | 39.5 |
| RS OF EXP (6) | 1.68620 | 1.71000 | 1.73940 | 1.77440 | 1.77300 |
| RS OF EXP (7) | 1.76191 | 1.76645 | 1.77206 | 1.77873 | 1.77847 |
| RS OF EXP (8) | 2.17160 | 2.26000 | 2.36920 | 2.49920 | 2.49400 |
| RS OF EXP (9) | 1.66600 | 1.70000 | 1.74200 | 1.79200 | 1.79000 |
| RS OF EXP (10) | 1.79397 | 1.795 | 1.79739 | 1.79964 | 1.79955 |
| RS OF EXP (11) | 2.13400 | 2.27000 | 2.43800 | 2.63800 | 2.63000 |

*RS = RIGHT SIDE

EXAMPLE 1 (TELEPHOTO END), OBJECT DISTANCE: INFINITY

SPHERICAL ABERRATION   ASTIGMATISM   DISTORTION

EXAMPLE 1 (TELEPHOTO END), OBJECT DISTANCE: 3m

SPHERICAL ABERRATION   ASTIGMATISM   DISTORTION

EXAMPLE 1 (TELEPHOTO END), OBJECT DISTANCE: 1.4m

FNo.=2.32
SPHERICAL ABERRATION

ω=1.4°
ASTIGMATISM

ω=1.4°
DISTORTION

EXAMPLE 1 (TELEPHOTO END), OBJECT DISTANCE: 0.75m(M.O.D.)

FNo.=2.47
SPHERICAL ABERRATION

ω=0.5°
ASTIGMATISM

ω=0.5°
DISTORTION

EXAMPLE 2 (TELEPHOTO END), OBJECT DISTANCE: INFINITY
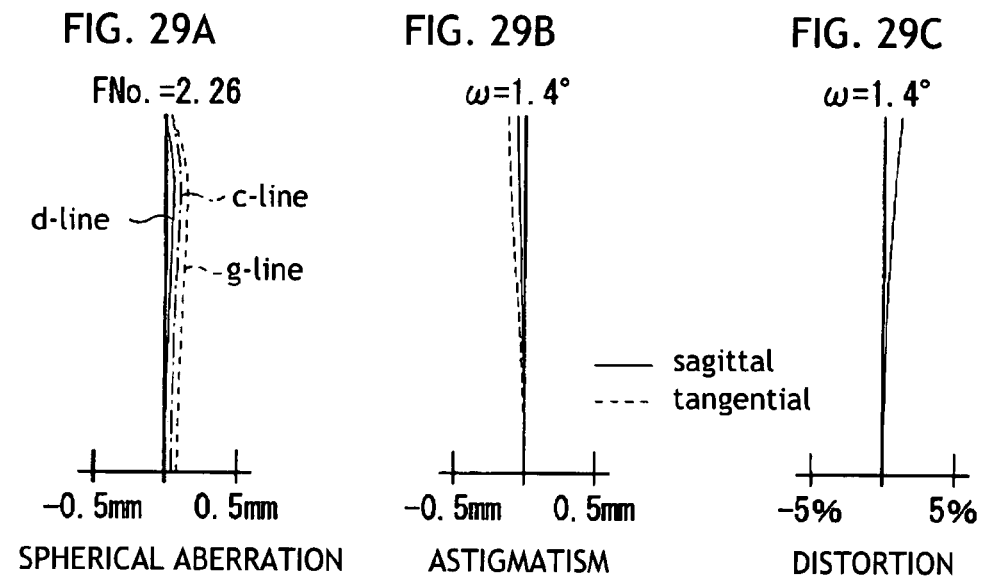
EXAMPLE 2 (TELEPHOTO END), OBJECT DISTANCE: 9.6m
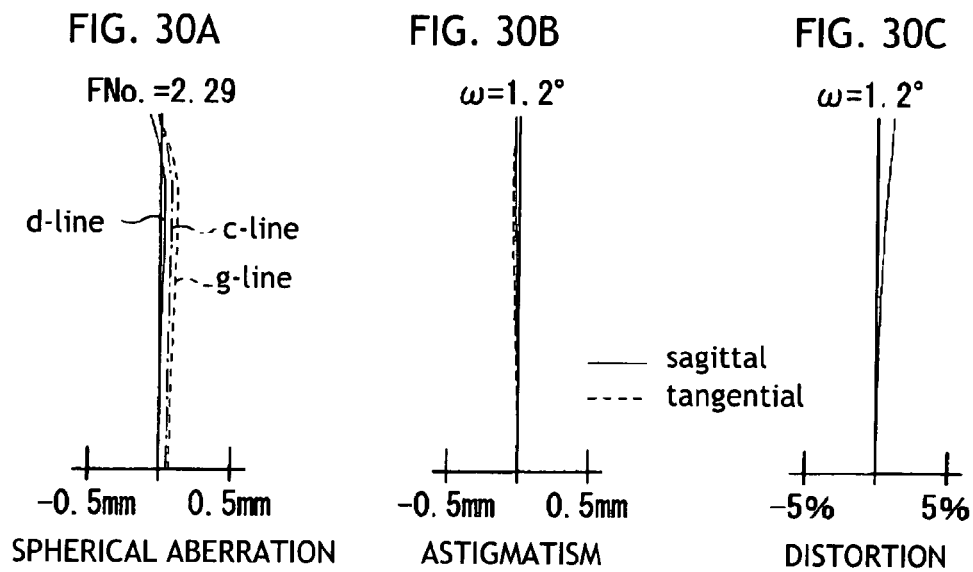

EXAMPLE 2 (TELEPHOTO END), OBJECT DISTANCE: 3.41m

SPHERICAL ABERRATION

ASTIGMATISM

DISTORTION

EXAMPLE 2 (TELEPHOTO END), OBJECT DISTANCE: 2.2m (M.O.D.)

SPHERICAL ABERRATION

ASTIGMATISM

DISTORTION

EXAMPLE 3 (TELEPHOTO END), OBJECT DISTANCE: INFINITY

SPHERICAL ABERRATION

ASTIGMATISM

DISTORTION

EXAMPLE 3 (TELEPHOTO END), OBJECT DISTANCE: 13.9m

SPHERICAL ABERRATION

ASTIGMATISM

DISTORTION

EXAMPLE 3 (TELEPHOTO END), OBJECT DISTANCE: 3.96m

SPHERICAL ABERRATION

ASTIGMATISM

DISTORTION

EXAMPLE 3 (TELEPHOTO END), OBJECT DISTANCE: 2.75m (M.O.D.)

SPHERICAL ABERRATION

ASTIGMATISM

DISTORTION

EXAMPLE 4 (TELEPHOTO END), OBJECT DISTANCE: INFINITY

SPHERICAL ABERRATION

ASTIGMATISM

DISTORTION

EXAMPLE 4 (TELEPHOTO END), OBJECT DISTANCE: 15.9m

SPHERICAL ABERRATION

ASTIGMATISM

DISTORTION

EXAMPLE 4 (TELEPHOTO END), OBJECT DISTANCE: 4.06m

SPHERICAL ABERRATION

ASTIGMATISM

DISTORTION

EXAMPLE 4 (TELEPHOTO END), OBJECT DISTANCE: 2.75m (M.O.D.)

SPHERICAL ABERRATION

ASTIGMATISM

DISTORTION

EXAMPLE 5 (TELEPHOTO END), OBJECT DISTANCE: INFINITY

SPHERICAL ABERRATION

ASTIGMATISM

DISTORTION

EXAMPLE 5 (TELEPHOTO END), OBJECT DISTANCE: 13.03m

SPHERICAL ABERRATION

ASTIGMATISM

DISTORTION

EXAMPLE 5 (TELEPHOTO END), OBJECT DISTANCE: 3.89m

FNo.=2.80
SPHERICAL ABERRATION

ω=0.3°
ASTIGMATISM

ω=0.3°
DISTORTION

EXAMPLE 5 (TELEPHOTO END),
OBJECT DISTANCE: 2.75m (M.O.D.)

FNo.=2.97
SPHERICAL ABERRATION

ω=0.6°
ASTIGMATISM

ω=0.6°
DISTORTION

ZOOM LENS AND IMAGE PICKUP APPARATUS

CROSS-REFERENCE TO RELATED APPLICATIONS

This application is based upon and claims the benefit of priority from the Japanese Patent Application No.2006-217945 filed on Aug. 10, 2006, the entire contents of which are incorporated herein by reference.

BACKGROUND OF THE INVENTION

1. Technical Field

The invention relates to a zoom lens suitable for a television camera, a video camera or the like, and more particularly to a zoom lens having a focusing group closer to the object side than a variator group and adapted to focus by moving some of its lens groups, as well as an image pickup apparatus having the zoom lens.

2. Description of the Related Art

As a large-aperture, high zoom-ratio zoom lens suitable for a television camera or a video camera, a four-group type zoom lens has been known which includes, in order from the object side, a focusing group having a positive refractive power, a variator group having a negative refractive power, a compensation group having a positive or negative refractive power, and a relay lens group having a positive refractive power. In addition, among such four-group type zoom lenses, an inner focus type lens has been known in which the focusing group is divided into a plurality of lens groups, and focusing is effected by moving some of its divided lens groups. For example, Japanese Patent No.3495772 (corresponding to U.S. Pat. No. 5,760,967) discloses a four-group inner focus type zoom lens in which a focusing group is divided, in order from the object side, into three lens groups, i.e., a group A having a negative refractive power, a group B1 having a positive refractive power, and a group B2 having a positive refractive power. Of these groups, the group B1 and the group B2 are moved. In the zoom lens disclosed in Japanese Patent No.3495772, when the zoom lens focuses from an infinitely distant object to a close-range object, focusing is effected so that the group B1 and the group B2 are moved to the object side with different amounts of movement, and that if the condition of MB2/MB1<1 is satisfied where MB1 and MB2 denote the amounts of movement of the group B1 and the group B2, respectively.

However, as for the zoom lens disclosed in Japanese Patent No.3495772, in the focusing group which, as a whole, has a positive refractive power, the first group (the group A) is constructed with the negative refractive power. Therefore, the positive refractive power of the second group (the group B1) and the third group (the group B2) must be made large. As a result, the thicknesses of the second group and the third group and the lens diameter tend to become large, and the mass tends to increase, so that there arises a problem that operability during focusing becomes poor.

SUMMARY OF THE INVENTION

The invention has been made in view of the circumstances, and provides a large-aperture, high zoom-ratio zoom lens and an image pickup apparatus which excel in operability during focusing.

According to an aspect of the invention, a zoom lens includes a variator group and a focusing group disposed on an object side relative to the variator group. The focusing group includes, in order from the object side, a first group having a positive refractive power, a second group having a positive refractive power, and a third group having a positive refractive power. The first group includes, in order from the object side, at least one concave lens and at least one convex lens. When the zoom lens focuses from an infinitely distant object to a close object, the second group and the third group are moved with different amounts of movement.

According to another aspect of the invention, an image pickup apparatus includes the zoom lens set forth above.

In the zoom lens and the image pickup apparatus having the above configuration, the respective groups in the focusing group are configured to have the positive refractive powers. Therefore, the positive refractive power is appropriately distributed to the respective groups in the focusing group. As a result, as compared with the case where the first group in the focusing group is of a negative refractive power, the refractive powers of the second group and the third group need not be made large more than required, and it is possible to suppress the tendency for the second group and the third group to increase in mass, to thereby prevent the aggravation of the operability during focusing.

In addition, by appropriately adopting the following conditions and satisfying the conditions, it is possible to further improve the operability and aberration performance.

In the zoom lens having the above configuration, when the zoom lens focuses, the second group and the third group may be moved so that with respect to a change in an object distance, the amount of movement of the second group becomes large in a region near infinity, while the amount of movement of the third group becomes large in a close range.

By so doing, if the second group and the third group are moved to the object side when focusing from the infinitely distant object to the closest object, even if air spacing between the second group and the third group is narrower than air spacing between the first group and the second group during the infinite focusing, the second group and the third group can be moved properly without mechanically interfering with each other.

Also, the second group and the third group may be moved so as to satisfy the following relation in a range of $0 \leq X2 \leq Z2/2$ $$|X3/Z3| \leq 0.14 \tag{1}$$

where Z2 and Z3 denote the amounts of movement of the second and third groups during the closest focusing, respectively, and X2 and X3 denote the amounts of movement of the second and third groups during focusing on an arbitrary finite object including an infinitely distant object, respectively.

By so doing, the amount of focusing movement in the region near infinity is appropriately regulated.

Also, the second group and the third group may be moved so as to satisfy the following relation in a range of $Z3/2 \leq Y3 \leq Z3$ $$|(Z2-Y2)/Z2| \leq 0.05 \tag{2}$$

where Z2 and Z3 denote the amounts of movement of the second and third groups during the closest focusing, respectively, and Y2 and Y3 denote the amounts of movement of the second and third groups during focusing on an arbitrary finite object including the closest object, respectively.

By so doing, the amount of focusing movement in a range near the closest object is appropriately regulated.

Also, the following conditional expressions may be satisfied $$0.013 \leq \phi 1/\phi F \leq 0.15 \quad (3)$$

$$0.36 \leq \phi 2/\phi F \leq 0.65 \quad (4)$$

$$0.74 \leq \phi 2/\phi 3 \leq 1.60 \quad (5)$$

where $\phi F$ denotes a refractive power of the whole focusing group, and $\phi 1$, $\phi 2$, and $\phi 3$ denote the refractive powers of the first group, the second group, and the third group, respectively.

By so doing, the refractive powers of the respective groups in the focusing group are optimized, which is advantageous to the aberration performance while ensuring the operability.

Also, the concave lens may be made of a lens material which is in a range that satisfies all of the following inequalities (6) to (8):

$$Nd1 \geq 0.014 vd1 + 1.22 \text{ (where } vd1 \geq 40) \quad (6)$$

$$Nd1 \geq 0.00267 vd1 + 1.673 \text{ (where } vd1 \leq 40) \quad (7)$$

$$Nd1 \leq 0.052 vd1 + 0.44 \quad (8)$$

where Nd1 denotes a refractive index of the concave lens of the first group with respect to d line, and vd1 denotes Abbe number of the concave lens of the first lens group.

By so doing, the lens material of the concave lens of the first group is optimized, which is advantageous to the aberration performance.

According to the zoom lens and the image pickup apparatus having the above configuration, since the respective groups in the focusing group are configured to have the positive refractive powers, and the positive refractive power is appropriately distributed among the respective groups in the focusing group. As a result, as compared with the case where the first group in the focusing group is of the negative refractive power, it is possible to suppress the tendency for the second group and the third group to increase in mass without enlarging the refractive powers of the second group and the third group more than required, to thereby make it possible to render the operability during focusing excellent.

BRIEF DESCRIPTION OF THE DRAWINGS

FIG. 9 is a diagram illustrating basic lens data of the zoom lens according to Example 1;

FIG. 12 is a diagram illustrating basic lens data of the zoom lens according to Example 2;

FIG. 15 is a diagram illustrating basic lens data of the zoom lens according to Example 3;

FIG. 18 is a diagram illustrating basic lens data of the zoom lens according to Example 4;

FIG. 21 is a diagram illustrating basic lens data of the zoom lens according to Example 5;

FIGS. 24A and 24B are diagrams illustrating values concerning conditional expressions, which are tabulated for each Example;

FIGS. 29A to 29C are aberration diagrams illustrating various aberrations at the telephoto end and at an object distance of infinity in the zoom lens according to Example 2, and respectively show spherical aberration, astigmatism, and distortion;

FIGS. 30A to 30C are aberration diagrams illustrating various aberrations at the telephoto end and at an object distance of 9.6 m in the zoom lens according to Example 2, and respectively show spherical aberration, astigmatism, and distortion;

DETAILED DESCRIPTION OF EMBODIMENTS OF THE INVENTION

Referring now to the accompanying drawings, an embodiment of the invention will be described below.

Figure 1:
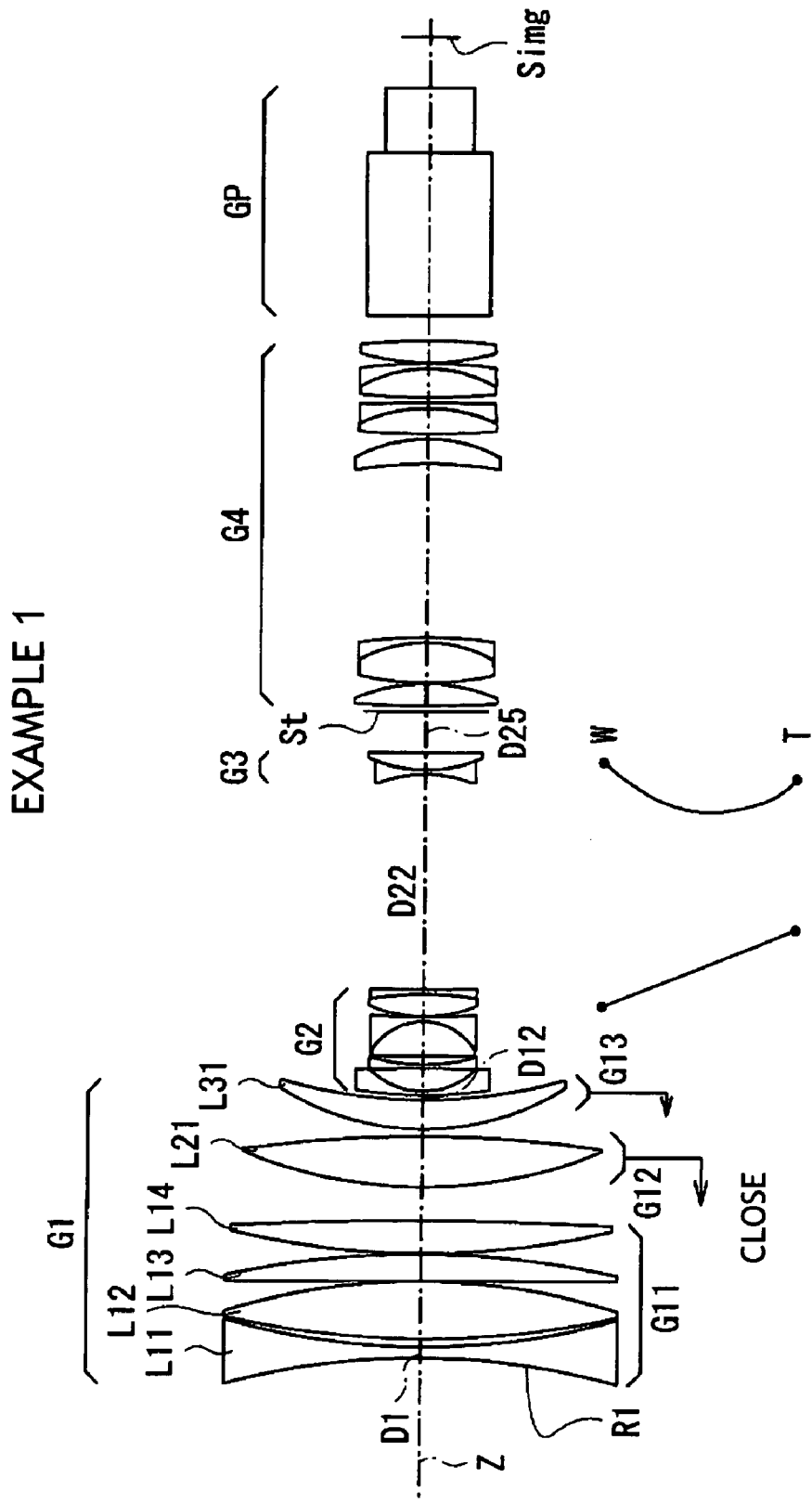
FIG. 1 shows a first configuration example of a zoom lens according to an embodiment of the invention, and is a section view of a lens corresponding to Example 1.
Figure 2:
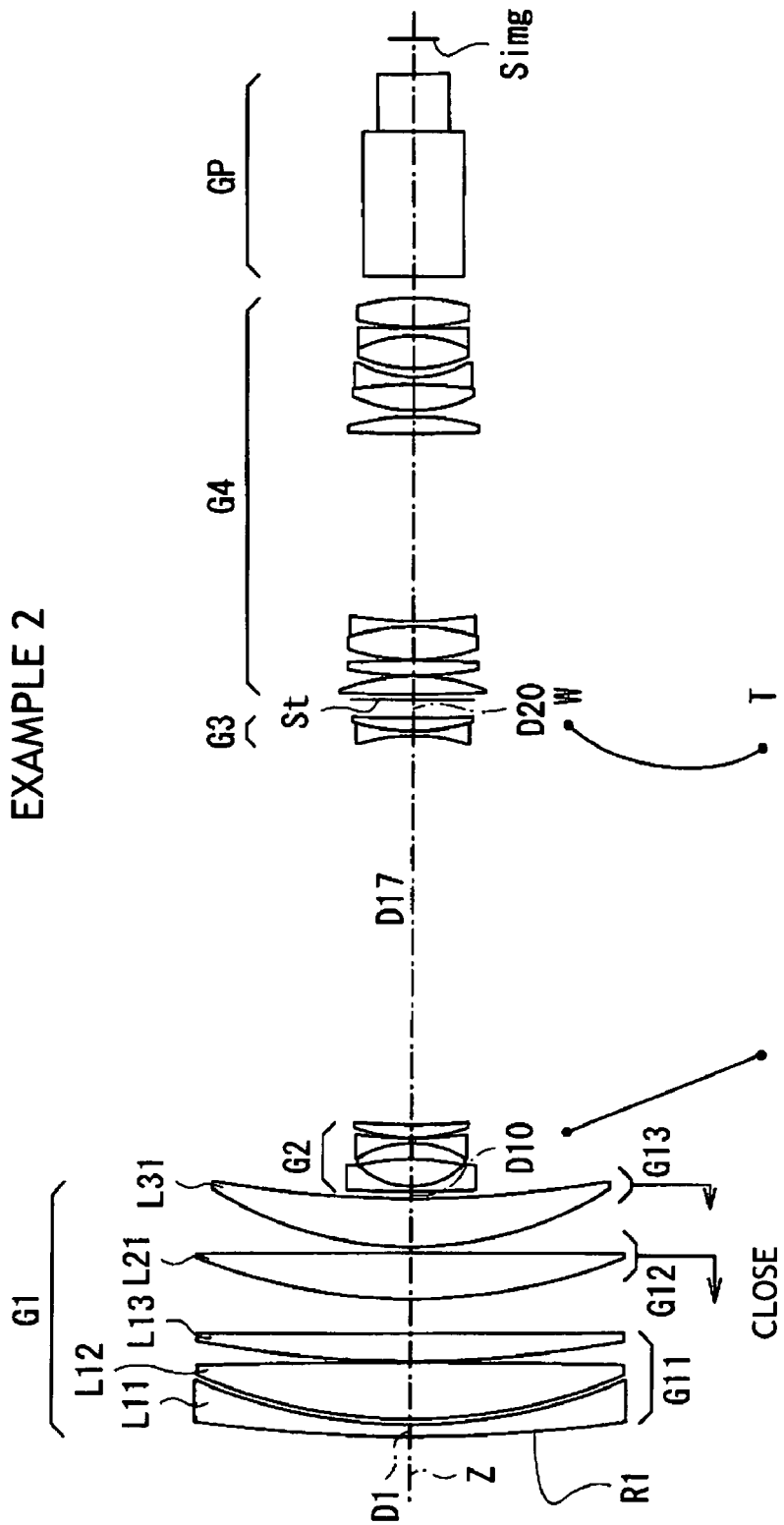
FIG. 2 shows a second configuration example of the zoom lens according to the embodiment of the invention, and is a section view of a lens corresponding to Example 2.
Figure 3:
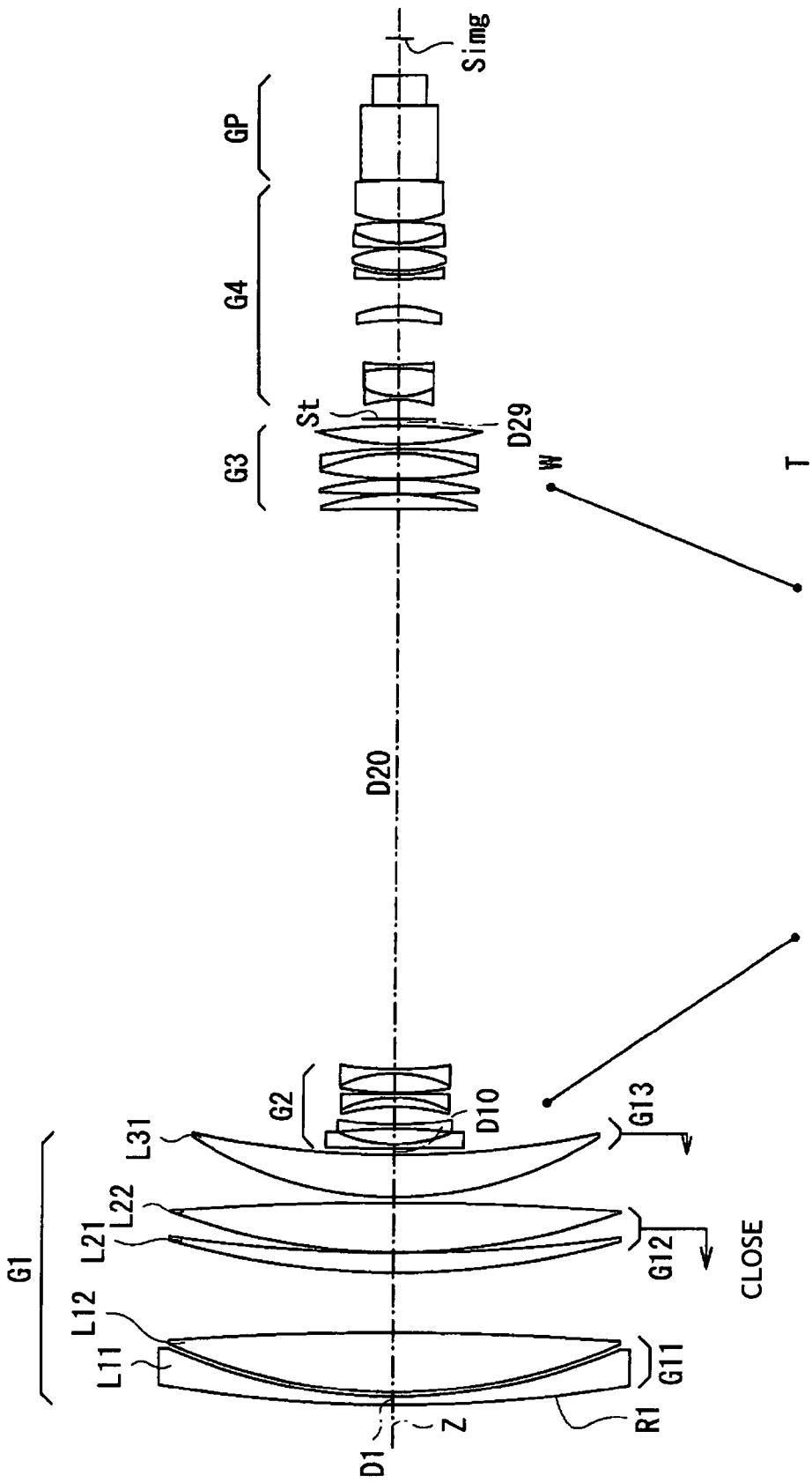
FIG. 3 shows a third configuration example of the zoom lens according to the embodiment of the invention, and is a section view of a lens corresponding to Example 3.
Figure 4:
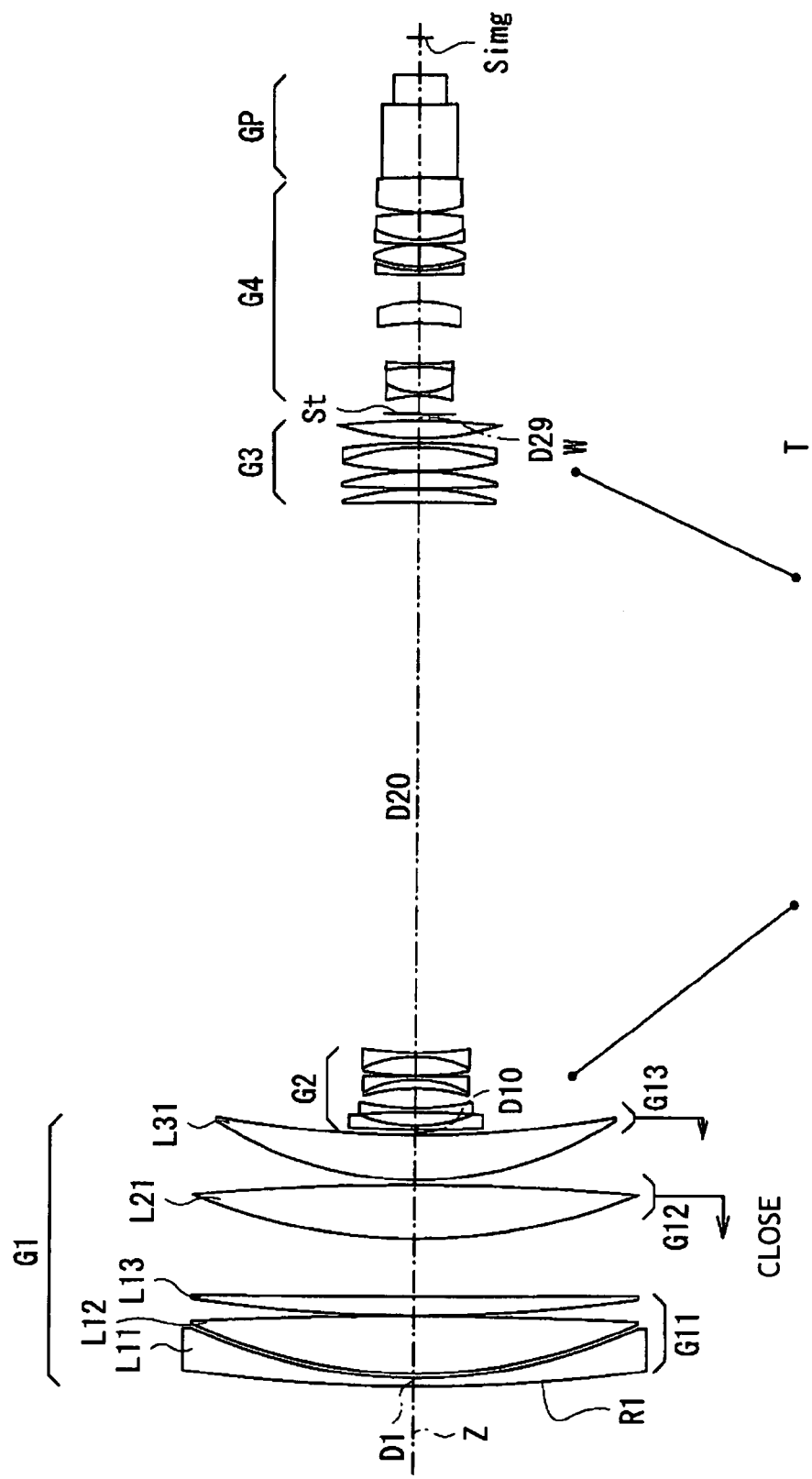
FIG. 4 shows a fourth configuration example of the zoom lens according to the embodiment of the invention, and is a section view of a lens corresponding to Example 4.
Figure 5:
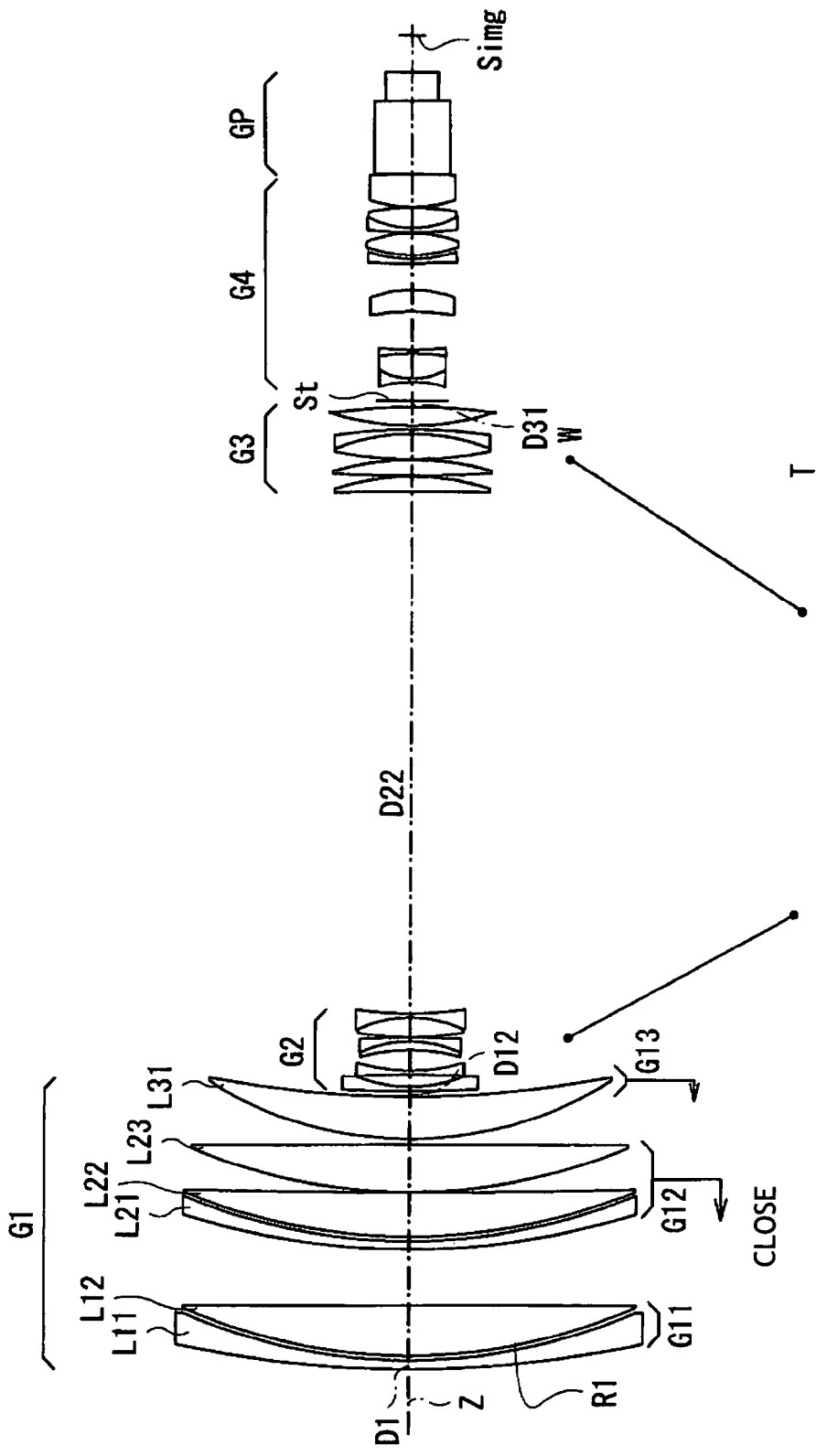
FIG. 5 shows a fifth configuration example of the zoom lens according to the embodiment of the invention, and is a section view of a lens corresponding to Example 5.

FIG. 1 shows a first configuration example of the zoom lens according to the embodiment of the invention. This configuration example corresponds to the lens configuration of a first numerical example (FIGS. 9, 10A, and 10B) which will be described later. FIG. 2 shows a second configuration example and corresponds to the lens configuration of a second numerical example (FIGS. 12, 13A, and 13B) which will be described later. FIG. 3 shows a third configuration example and corresponds to the lens configuration of a third numerical example (FIGS. 15, 16A, and 16B) which will be described later. FIG. 4 shows a fourth configuration example and corresponds to the lens configuration of a fourth numerical example (FIGS. 18, 19A, and 19B) which will be described later. FIG. 5 shows a fifth configuration example and corresponds to the lens configuration of a fifth numerical example (FIGS. 21, 22A, and 22B) which will be described later. It should be noted that FIGS. 1 to 5 show lens layout with the zoom lens focusing an infinitely distant object at the wide-angle end. In FIGS. 1 to 5, reference character R1 denotes a radius of curvature of the surface of a constituent element closest to the object. Reference character Di denotes a surface distance between an i-th surface and an (i+1)th surface on an optical axis Z. It is noted that as for the reference character Di, the reference character is attached to a surface distance portion which changes during variation of magnification. It is noted that the basic configuration is identical in the respective configuration examples.

This zoom lens is configured as a large-aperture, high zoom-ratio zoom lens suitable for a television camera, a video camera or the like. This zoom lens is of a four-group type including, in order from the object side along the optical axis Z, a focusing group G1 having a positive refractive power, a variator group G2 having a negative refractive power, a compensation group G3 having a positive or negative refractive power, and a relay lens group G4 having a positive refractive power. The compensation group G3 has a negative refractive power in the first and second configuration examples shown in FIGS. 1 and 2, and a positive refractive power in the third to fifth configuration examples shown in FIGS. 3 to 5. An aperture stop St is disposed between the compensation group G3 and the relay lens group G4.

An unillustrated imaging element such as a charge-coupled device (CCD) or a complementary metal-oxide semiconductor (CMOS) is disposed on an image forming plane (imaging plane) Simg of this zoom lens. In addition, a prism block GP for color separations is disposed between the relay lens group G4 and the imaging plane. The unillustrated imaging element outputs an electrical signal (an imaging signal) corresponding to a subject image formed by this zoom lens. An image pickup apparatus includes at least the zoom lens and the imaging element.

In this zoom lens, the variator group G2 and the compensation group G3 move during variation of magnification as their loci are shown in the respective drawings. Namely, the variator group G2 is adapted to move to an image side along the optical axis Z as the magnification is changed from a wide-angle end (W) to a telephoto end (T). In the first and second configuration examples shown in FIGS. 1 and 2, to compensate for the change in the image plane accompanying the change in magnification, the compensation group G3 moves to the image side after having moved to the object side along the optical axis Z as the magnification is changed from the wide-angle end to the telephoto end. On the other hand, in the third to fifth configuration examples shown in FIGS. 3 to 5, the compensation group G3 moves to the object side along the optical axis Z as the magnification is changed from the wide-angle end to the telephoto end. In the focusing group G1, some of its internal lens groups move along the optical axis Z during focusing in each variable magnification range. The relay lens group G4 is always fixed during the variation of magnification and during focusing.

The focus group G1 includes, in order from the object side, a first group G11, a second group G12 and a third group G13. All of the first group G11, the second group G12, and the third group G13 have positive refractive power.

The first group G11 has, in order from the object side, at least one concave lens and at least one convex lens. For example, the first group G11 includes one concave lens L11 and three convex lenses L12, L13, and L14. However, the first group G11 may be constituted by one concave lens L11 and two convex lenses L12 and L13 as in the second and fourth configuration examples (FIGS. 2 and 4). Also, the first group G11 may be constituted by one concave lens L11 and one convex lens L123 as in the third and fifth configuration examples (FIGS. 3 and 5).

The second group G12 includes, for example, one lens L21. However, the second group G12 may include two lenses L21 and L22 as in the third configuration example. Also, the second group G12 may include three lenses L21, L22, and L23 as in the fifth configuration example. The third group G13 includes, for example, one lens L31.

In focusing from the infinitely distant object to the closest object, the second group G12 and the third group G13 during the closest focusing are adapted to move to the object side as compared to their position for the infinitely distant object. At this time, the second group G12 and the third group G13 are adapted to move with different amounts of movement along the optical axis Z. For example, during focusing, the second group G12 and the third group G13 are preferably moved so that with respect to a change in the object distance, the amount of movement of the second group G12 becomes large in a region near infinity, while the amount of movement of the third group G13 becomes large in a close range. As a result, if the second group G12 and the third group G13 are moved to the object side when focusing from the infinitely distant object to the closest object, even if the air spacing between the second group G12 and the third group G13 is narrower than the air spacing between the first group G11 and the second group G12 during the infinite focusing, the second group G12 and the third group G13 can be moved properly without mechanically interfering with each other. It is noted that the first group G11 is a fixed group which remains constantly stationary during focusing and during the variation of the magnification.

Also, the second group G12 and the third group G13 are preferably moved so as to satisfy the following relation in a range of $0 \leq X2 \leq Z2/2$ $$|X3/Z3| \leq 0.14 \tag{1}$$

where Z2 and Z3 denote the amounts of movement of the second and third groups G12, G13 during the closest focusing, respectively, and X2 and X3 denote the amounts of movement of the second and third groups G12, G13 during focusing on an arbitrary finite object including an infinitely distant object, respectively.

Also, the second group G12 and the third group G13 are preferably moved so as to satisfy the following relation in a range of $Z3/2 \leq Y3 \leq Z3$ $$|(Z2-Y2)/Z2| \leq 0.05 \tag{2}$$

where Z2 and Z3 denote the amounts of movement of the second and third groups G12, G13 during the closest focusing, respectively, and Y2 and Y3 denote the amounts of movement of the second and third groups G12, G13 during focusing on an arbitrary finite object including the closest object, respectively.

Also, the following conditional expressions are preferably satisfied $$0.013 \leq \phi1/\phi F \leq 0.15 \tag{3}$$

$$0.36 \leq \phi2/\phi F \leq 0.65 \tag{4}$$

$$0.74 \leq \phi2/\phi3 \leq 1.60 \tag{5}$$

where φF denotes a refractive power of the whole focusing group, and

φ1, φ2, and φ3 denote the refractive powers of the first group G11, the second group G12, and the third group G13, respectively.

Also, the concave lens L11 is made of a lens material which is in a range that satisfies all of the following inequalities (6) to (8):

$$Nd1 \geq 0.014 vd1 + 1.22 \text{ (where } vd1 \geq 40\text{)} \tag{6}$$

$$Nd1 \geq 0.00267 vd1 + 1.673 \text{ (where } vd1 \leq 40\text{)} \tag{7}$$

$$Nd1 \leq 0.052 vd1 + 0.44 \tag{8}$$

where Nd1 denotes a refractive index of the concave lens L11 of the first group G11 with respect to d line, and vd1 denotes Abbe number of the concave lens L11 of the first group G11.

The operation and effect of the zoom lens configured as described above will be described below. It is noted that since the characteristic feature of this zoom lens lies in the configuration of the focusing group G1, a description will be given on the operation and effect concerning the configuration of that part, in particular.

In the case of a high-magnification, long-focus zoom lens, axial chromatic aberration in the telephoto range and comatic aberration occurring in the focusing group G1 need to be compensated for with a good balance. To suppress the amount of residual secondary spectrum of the axial chromatic aberration, it is necessary to appropriately select the concave lens L11 in the first group G11. By so doing, the refractive power distribution, shape, and lens material of the convex lenses which follow the first group G11 and which are in the focusing group G1 can be determined relatively easily by optimization. If the selection of the material of the concave lens L11 is mistaken, the comatic aberration occurring in the focusing group G1 when the amount of axial chromatic aberration is optimally corrected is enlarged by the lenses that follow, primarily the variator group G2, and become undercorrected. This results in the deterioration of MTF of high-frequency components and the deterioration of performance due to the fact that the image surface when the aperture stop St is stopped down is undercorrected, coupled with the fact that spherical aberrations and the curvature of field become undercorrected. Thus, it becomes necessary to select a glass material for the concave lens L11 in the first group G11 and appropriately arrange the refractive powers of the convex lenses that follow in the focusing group G1. Additionally, by constructing all of the groups in the focusing group G1 so as to have positive refractive powers, the positive refractive power is appropriately distributed to the respective groups in the focusing group G1. As a result, as compared with the case where the first group G11 in the focusing group G1 is of negative refractive power, it is possible to suppress the tendency for the second group G12 and the third group G13 to increase in mass, to thereby make it possible to render the operability during focusing excellent.

Hereafter, the conditional expressions will be described below.

Figure 6:
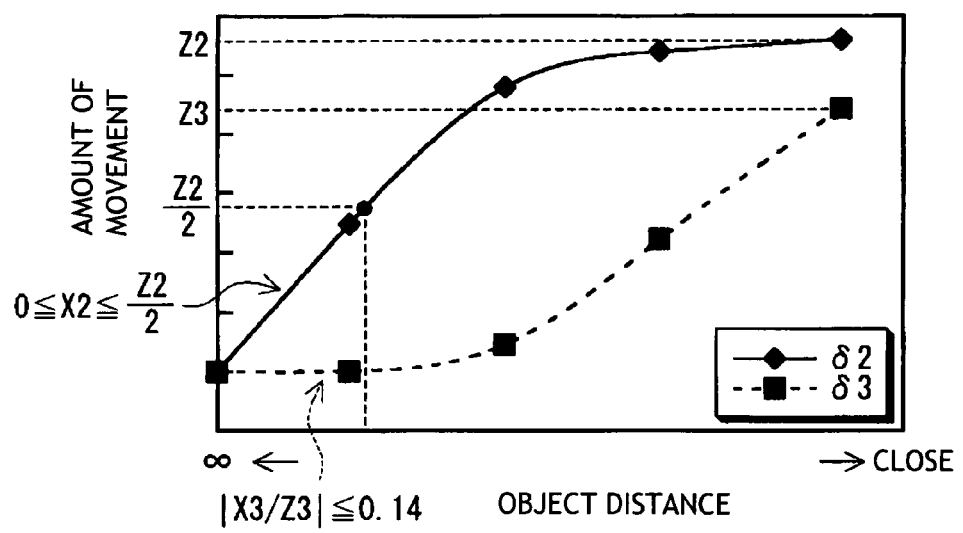
FIG. 6 is an explanatory diagram on an amount of focusing movement in a range near an infinitely distant object.
Figure 7:
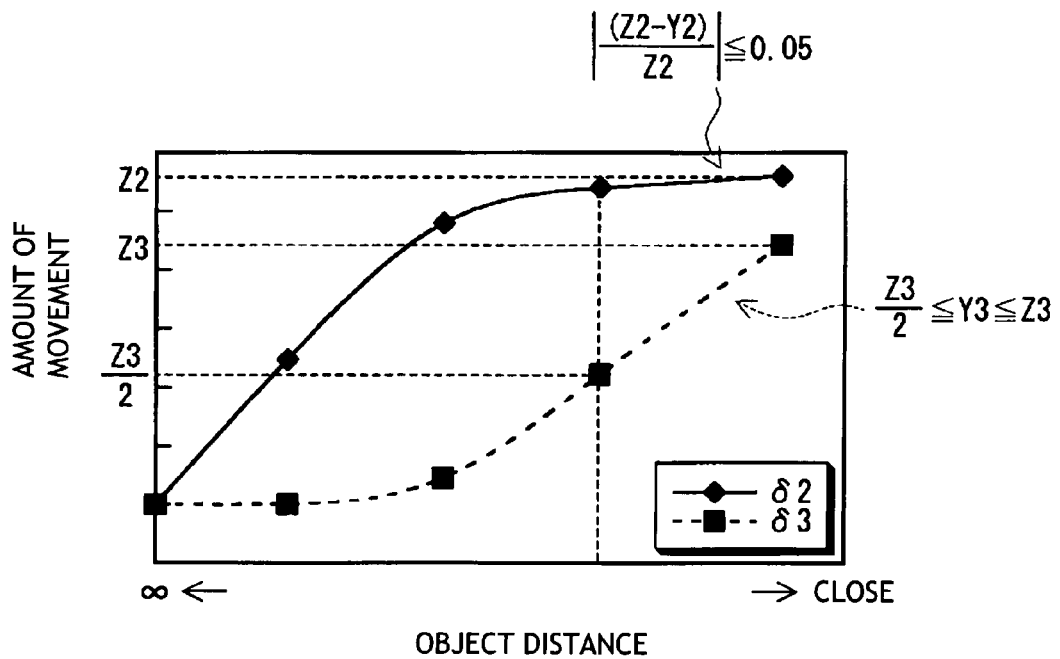
FIG. 7 is an explanatory diagram on the amount of focusing movement in a range near a closest object.

First, referring to FIGS. 6 and 7, the conditional expressions (1) and (2) will be described. In FIGS. 6 and 7, the abscissa shows the object distance, and the ordinate shows the amount of movement ($\delta 2$) of the second group G12 and the amount of movement ($\delta 3$) of the third group G13. The amounts of movement $\delta 2$ and $\delta 2$ show amounts of movement using, as a reference, a lens position with the zoom lens focusing an infinitely distant object. It is noted that FIGS. 6 and 7 are schematic diagrams for explaining the concept of the conditional expressions (1) and (2), and that it does not follow that the lenses of the respective configuration examples move utterly in the same way as this. Specific examples of the amounts of focusing movement in the lenses of the respective configuration examples will be described later.

As shown in FIGS. 6 and 7, the second group G12 and the third group G13 move so that their positions for a closest object are located on the object side as compared to their position for an infinitely distant object. At this time, the second group G12 and the third group G13 move so that the amount of movement ($\delta 2$) of the second group G12 and the amount of movement ($\delta 3$) of the third group G13 are different.

The conditional expression (1) regulates the amount of focusing movement of the third group G13 in a range of $0 \leq X2 \leq Z2/2$ where X2 denotes the amount of movement of the second group G12 during focusing on an arbitrary finite object including an infinitely distant object. In the case where the second group G12 and the third group G13 are moved so that with respect to a change in the object distance, the amount of movement of the second group G12 becomes large in the region near infinity, while the amount of movement of the third group G13 becomes large in the close range, the range of $0 \leq X2 \leq Z2/2$ shows the amount of movement in the range near the infinitely distant object, as shown in FIG. 6. Namely, the conditional expression (1) regulates the amount of focusing movement of the third group G13 in the range near the infinitely distant object. To satisfy the conditional expression (1) means that the amount of focusing movement of the third group G13 in the range near the infinitely distant object is relatively small compared to that in the close range. By effecting focusing by moving almost only the second group G12 in the range near the infinitely distant object so as to satisfy the conditional expression (1), it is possible to suppress variations of axial chromatic aberration on the far distance side and suppress variations of the field curvature at a reference wavelength.

The conditional expression (2) regulates the amount of focusing movement of the third group G13 in a range of $Z3/2 \leq Y3 \leq Z3$ where Y3 denotes the amount of movement of the third group G13 during focusing on an arbitrary finite object including a closest object. In the case where the second group G12 and the third group G13 are moved so that with respect to the change in the object distance, the amount of movement of the second group G12 becomes large in the region near infinity, while the amount of movement of the third group G13 becomes large in the close range, the range of $Z3/2 \leq Y3 \leq Z3$ shows the amount of movement in the range near the closest object, as shown in FIG. 7. Namely, to satisfy the conditional expression (2) means that the amount of focusing movement of the second group G12 in the range near the closest object is relatively small compared to that in the range near infinity. By effecting focusing by moving almost only the third group G13 in the range near the closest object so as to satisfy the conditional expression (2), it is possible to make the moving lens groups lightweight and improve the operability.

The conditional expressions (3) to (5) optimize the refractive powers of the respective groups in the focusing group G1. In particular, the conditional expression (3) defines an appropriate refractive power of the first group G11. In a range below the lower limit of the conditional expression (3), the refractive power of the first group G11 becomes weak, the refractive powers of the second group G12 and its successive groups increase. As a result, spherical aberrations and the curvature of field become large in an undercorrected manner, and commatic aberrations also increase. To correct them, the enlargement in size by increasing the number of lenses becomes unavoidable. In a range exceeding the upper limit of the conditional expression (3), positive refractive powers of the second group G12 and the third group G13 become weak, and the amount of focusing movement disadvantageously increases. As a result, the overall lens length becomes unfavorably large.

The conditional expression (4) regulates an appropriate refractive power of the second group G12. The conditional expression (4) makes it possible to render the focusing group G1 compact in size and regulates the refractive power of the second group G12 so that aberration correction can be satisfactorily suppressed when focusing from the telephoto end to the wide-angle end. In a range lower than the lower limit of the conditional expression (4), the refractive power of the second group G12 becomes weak, and the amount of its movement at an arbitrary object distance needs to be made large. As a result, the overall length of the focusing system becomes unfavorably long. In a range exceeding the upper limit of the conditional expression (4), the refractive power of the second group G12 becomes strong, resulting in an increase in spherical aberration, an increase in commatic aberration, and aberration deterioration in which the field curvature becomes undercorrected. To correct them, there arises a need to increase the number of lens elements, so that the focusing system unfavorably tends to be large in size.

The conditional expression (5) defines an appropriate balance in the refractive power between the second group G12 and the third group G13. The conditional expression (5) is a relational expression for keeping wide the focusing range allowing aberration correction to be effected satisfactorily when the zoom lens focuses from the infinitely distant object to the close side. It can be said that this conditional expression is a relational expression which causes a difference from a one-group inner focusing system in which focusing is performed by the integration of the second group G12 and the third group G13. In a range lower than the lower limit of the conditional expression (5), the range in which focusing can be performed by the movement of the second group G12 becomes narrow. Namely, the focusing range from infinity which allows satisfactory correction becomes narrow. In addition, in a range exceeding the upper limit of the conditional expression (5), the refractive power of the second group G12 becomes strong, and although the focusing range from infinity by the movement of the second group G12 can be made large, the deterioration in various aberrations becomes noticeable.

The inequalities (6) to (8) are expressions which define an appropriate range for the lens material of the concave lens L11 in the first group G11. It is preferred that the lens material of the concave lens L11 be in a range which satisfies all of these three inequalities. In a range outside the inequalities (6) and (7), the curvature of the concave lens L11 becomes large, and it becomes difficult for high-order aberrations occurring there to be compensated for by the lenses in the focusing group G1 that follow. Meanwhile, in a range outside the condition of the inequality (6), axial chromatic aberrations become undercorrected on the short-wavelength side. In a range outside the condition of the inequality (8), the residual secondary spectrum of the axial chromatic aberrations becomes large, making it impossible to satisfy the high performance. More preferably, the inequalities (6) to (8) provide higher performance if their ranges are narrowed as in the following inequalities (9) to (11):

$$Nd1 \geq 0.02vd1+1.0 \text{ (where, } vd1 \geq 40) \quad (9)$$

$$Nd1 \geq 0.0009vd1+1.764 \text{ (where, } vd1 \leq 40) \quad (10)$$

$$Nd1 \leq 0.08vd1-0.53 \quad (11)$$

Figure 8:
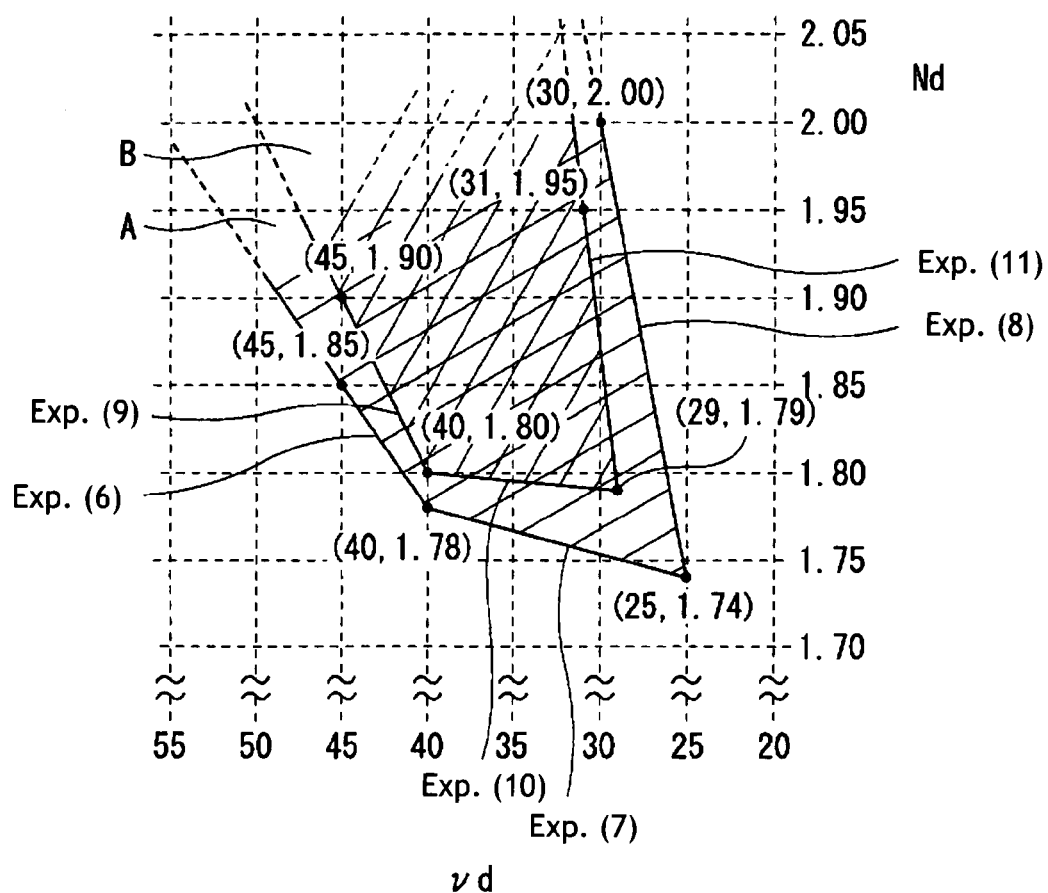
FIG. 8 is an explanatory diagram illustrating a preferable range of a lens material.

FIG. 8 shows ranges of the lens material defined by the inequalities (6) to (8) and by the inequalities (9) to (11). The abscissa of FIG. 8 is the Abbe number $vd$, and the ordinate is the refractive index $Nd$. A region A is the range defined by the inequalities (6) to (8), and a region B is the range defined by the inequalities (9) to (11).

As described above, according to the zoom lens of this embodiment, the respective groups in the focusing group G1 are configured to have positive refractive powers, and the positive refractive power is distributed appropriately among the respective groups in the focusing group. Therefore, as compared with the case where the first group G11 in the focusing group G1 is of a negative refractive power, it is possible to suppress the tendency of the second group G12 and the third group G13 to increase in mass, and operability during focusing can be made excellent. In addition, by appropriately adopting preferable conditions and satisfying them, it is possible to further improve the operability and aberration performance.

EXAMPLES

Next, specific numerical examples of the zoom lens according to this embodiment will be described below. Hereinafter, first to fifth numerical examples will be described collectively.

FIG. 9 shows Example 1 specific lens data corresponding to the configuration of the zoom lens shown in FIG. 1. The column for surface number Si in the lens data shown in FIG. 9 indicates the number of an i-th (i=1 to 44) surface wherein with respect to the zoom lens according to Example 1, the surface of the component element on the most subject side is referred to as a first surface, the number is sequentially incremented toward the image side. The column for a radius of curvature Ri indicates a value (mm) of the radius of curvature of the i-th surface from the object side by setting the reference character R1 attached in FIG. 1 as a radius of curvature of the first surface. Similarly, the column for a surface distance Di indicates an interval (mm) between an i-th surface Si from the object side and an (i+1)th surface Si+1. The column for Ndi indicates a value of the refractive index between adjacent lens surfaces, with respect to d-line (wavelength=587.6 nm). The column for vdj indicates the Abbe number of a j-th optical element from the object side with respect to the d-line. As various data, FIG. 9 also shows values of a paraxial focal length f (mm) of the whole system at the wide-angle end and the telephoto end, F number (FNo.), and the half angle of view ω.

Figures 10A, 10B, 11:
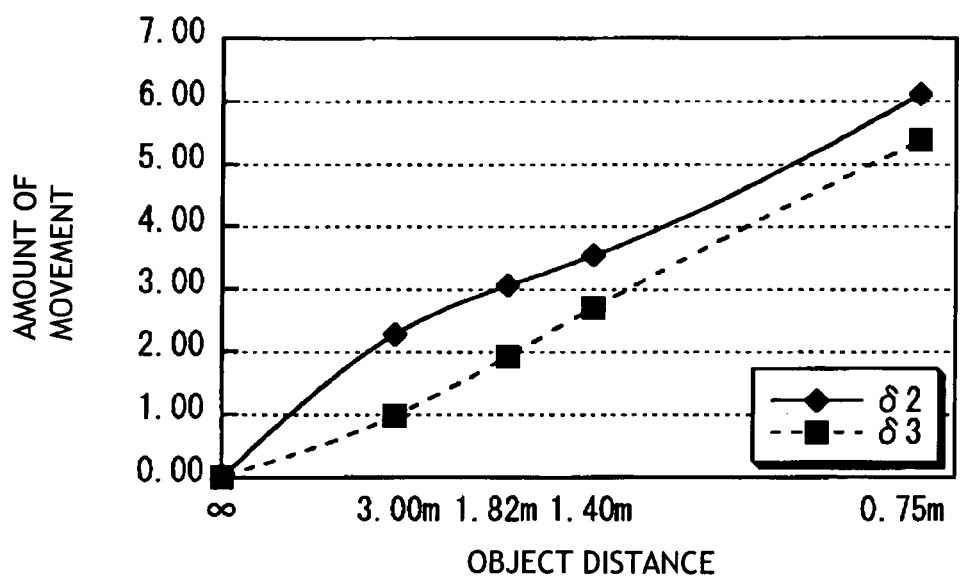
FIG. 10A is a diagram illustrating surface distances between portions which move during variation of magnification in the zoom lens according to Example 1.
FIG. 10B is a diagram illustrating the amounts of movement of lens groups which move during focusing in the zoom lens according to Example 1.
FIG. 11 is a graph illustrating the amounts of lens movement during focusing in the zoom lens according to Example 1.

In the zoom lens according to Example 1, since the variator group G2 and the compensation group G3 move along the optical axis during variation of magnification, values of surface distances D12, D22, and D25 in front of or in rear of these groups are variable. FIG. 10A shows values at the wide-angle end, an intermediate focal length, and the telephoto end as data on these variable surface distances during variation of magnification. In addition, in the zoom lens of this Example 1, the second group G12 and the third group G13 of the focusing group G1 move along the optical axis during focusing at each variable magnification range. FIG. 10B shows the amount of movement δ2 (mm) of the second group G12 and the amount of movement δ3 (mm) of the third group G13 at a finite object distance during focusing. In addition, FIG. 11 shows variations in the amounts of movement δ2 and δ3 of the second group G12 and the third group G13, with the abscissa showing the object distance and the ordinate showing the amount of movement during focusing. It is noted that the loci of the amounts of movement δ2 and δ3 during focusing in the respective variable magnification ranges are identical.

Figures 13A, 13B, 14:
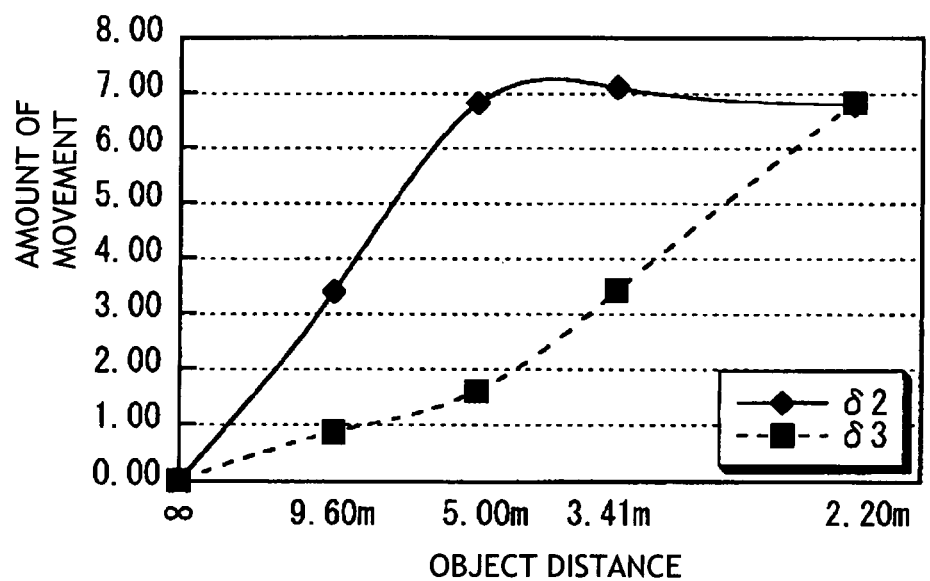
FIG. 13A is a diagram illustrating surface distances between the portions which move during variation of magnification in the zoom lens according to Example 2.
FIG. 13B is a diagram illustrating the amounts of movement of the lens groups which move during focusing in the zoom lens according to Example 2.
FIG. 14 is a graph illustrating the amounts of lens movement during focusing in the zoom lens according to Example 2.

In the same way as the zoom lens of Example 1, specific lens data corresponding to the configuration of the zoom lens shown in FIG. 2 is shown in FIG. 12 (i=1 to 41) as Example 2. In the zoom lens of this Example 2 as well, since the variator group G2 and the compensation group G3 move along the optical axis during variation of magnification, values of surface distances D10, D17, and D20 in front of or in rear of these groups are variable. FIG. 13A shows data on these variable surface distances during variation of magnification. FIG. 13B shows the amount of movement δ2 of the second group G12 and the amount of movement δ3 of the third group G13 at a finite object distance during focusing. In addition, FIG. 14 shows variations in the amounts of movement δ2 and δ3 of the second group G12 and the third group G13, with the abscissa showing the object distance and the ordinate showing the amount of movement during focusing. It is noted that the loci of the amounts of movement δ2 and δ3 during focusing in the respective variable magnification ranges are identical.

Figures 16A, 16B, 17:
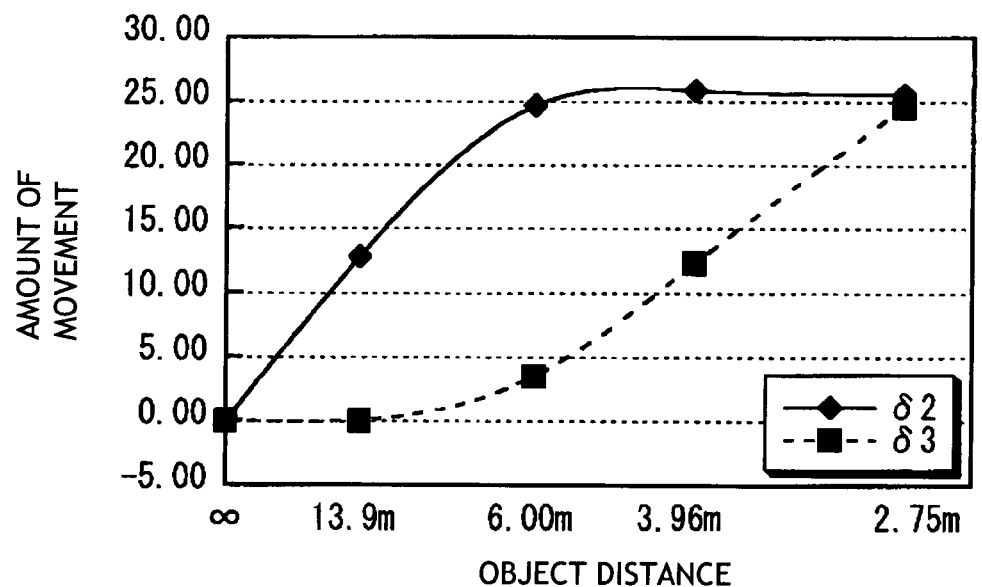
FIG. 16A is a diagram illustrating surface distances between the portions which move during variation of magnification in the zoom lens according to Example 3.
FIG. 16B is a diagram illustrating the amounts of movement of the lens groups which move during focusing in the zoom lens according to Example 3.
FIG. 17 is a graph illustrating the amounts of lens movement during focusing in the zoom lens according to Example 3.

Similarly, specific lens data corresponding to the configuration of the zoom lens shown in FIG. 3 is shown in FIG. 15 (i=1 to 48) as Example 3. In the zoom lens of this Example 3 as well, since the variator group G2 and the compensation group G3 move along the optical axis during variation of magnification, values of surface distances D10, D20, and D29 in front of or in rear of these groups are variable. FIG. 16A shows data on these variable surface distances during variation of magnification. FIG. 16B shows the amount of movement δ2 of the second group G12 and the amount of movement δ3 of the third group G13 at a finite object distance during focusing. In addition, FIG. 17 shows variations in the amounts of movement δ2 and δ3 of the second group G12 and the third group G13, with the abscissa showing the object distance and the ordinate showing the amount of movement during focusing. It is noted that the loci of the amounts of movement δ2 and δ3 during focusing in the respective variable magnification ranges are identical.

Figures 19A, 19B, 20:
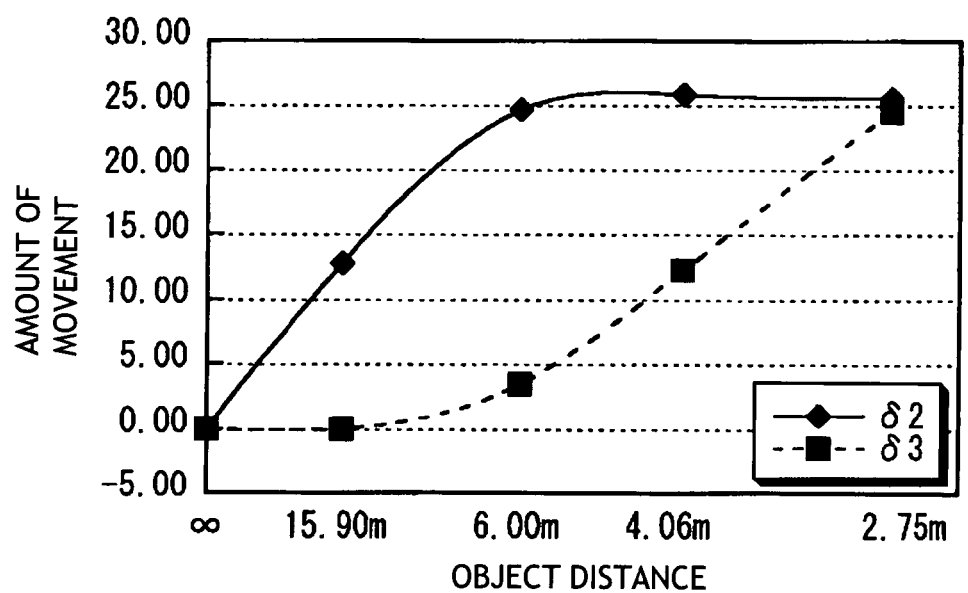
FIG. 19A is a diagram illustrating surface distances between the portions which move during variation of magnification in the zoom lens according to Example 4.
FIG. 19B is a diagram illustrating the amounts of movement of the lens groups which move during focusing in the zoom lens according to Example 4.
FIG. 20 is a graph illustrating the amounts of lens movement during focusing in the zoom lens according to Example 4.

Similarly, specific lens data corresponding to the configuration of the zoom lens shown in FIG. 4 is shown in FIG. 18 (i=1 to 48) as Example 4. In the zoom lens of this Example 4 as well, since the variator group G2 and the compensation group G3 move along the optical axis during variation of magnification, values of surface distances D10, D20, and D29 in front of or in rear of these groups are variable. FIG. 19A shows data on these variable surface distances during variation of magnification. FIG. 19B shows the amount of movement δ2 of the second group G12 and the amount of movement δ3 of the third group G13 at a finite object distance during focusing. In addition, FIG. 20 shows variations in the amounts of movement δ2 and δ3 of the second group G12 and the third group G13, with the abscissa showing the object distance and the ordinate showing the amount of movement during focusing. It is noted that the loci of the amounts of movement δ2 and δ3 during focusing in the respective variable magnification ranges are identical.

Figures 22A, 22B, 23:
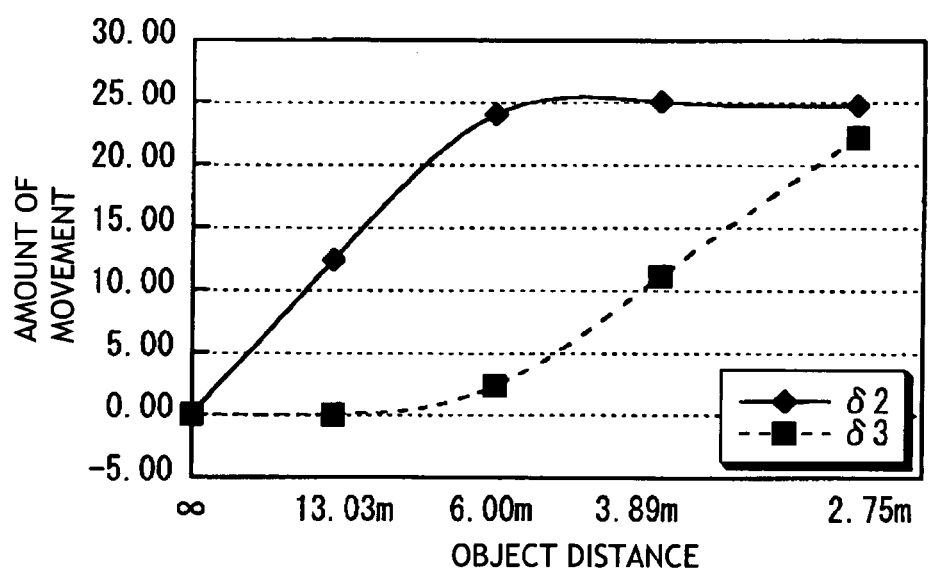
FIG. 22A is a diagram illustrating surface distances between the portions which move during variation of magnification in the zoom lens according to Example 5, and FIG. 22B a diagram illustrating the amounts of movement of the lens groups which move during focusing in the zoom lens according to Example 5.
FIG. 23 is a graph illustrating the amounts of lens movement during focusing in the zoom lens according to Example 5.

Similarly, specific lens data corresponding to the configuration of the zoom lens shown in FIG. 5 is shown in FIG. 21 (i=1 to 50) as Example 5. In the zoom lens of this Example 5 as well, since the variator group G2 and the compensation group G3 move along the optical axis during variation of magnification, values of surface distances D12, D22, and D31 in front of or in rear of these groups are variable. FIG. 22A shows data on these variable surface distances during variation of magnification. FIG. 22B shows the amount of movement δ2 of the second group G12 and the amount of movement δ3 of the third group G13 at a finite object distance during focusing. In addition, FIG. 23 shows variations in the amounts of movement δ2 and δ3 of the second group G12 and the third group G13, with the abscissa showing the object distance and the ordinate showing the amount of movement during focusing. It is noted that the loci of the amounts of movement δ2 and δ3 during focusing in the respective variable magnification ranges are identical.

FIGS. 24A and 24B show values relating to the respective conditional expressions, which are tabulated for each Example. It is noted that in FIG. 24A, the portions which are highlighted by hatching indicate that the values are out of the conditional expressions. Namely, the zoom lens of Example 1 does not satisfy the conditions of the conditional expressions (1) and (2) relating to the amount of focusing movement. This is because as for the zoom lens of Example 1, since its focal distance at the telephoto end is relatively shorter than those of the other Examples and the absolute value of the residual axial chromatic aberration is originally small, the effect of suppressing the distance variation of axial chromatic aberrations by the focusing system of the invention is not much required, and variations of various aberrations due to the distance variation of the reference wavelength have been suppressed. The values of the respective Examples fall within the numeral ranges of the respective conditional expressions except that the zoom lens of Example 1 does not satisfy the conditions of the conditional expressions (1) and (2).

Figure 25A:
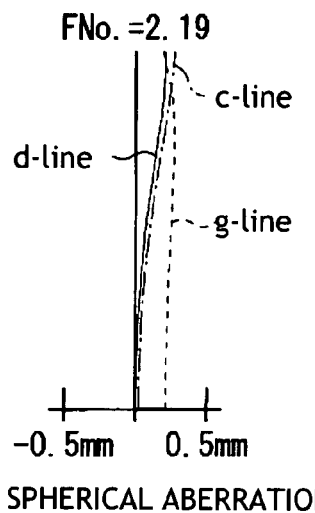
FIGS. 25A to 25C are aberration diagrams illustrating various aberrations at the telephoto end and at an object distance of infinity in the zoom lens according to Example 1, and respectively show spherical aberration, astigmatism, and distortion.
Figure 25B:
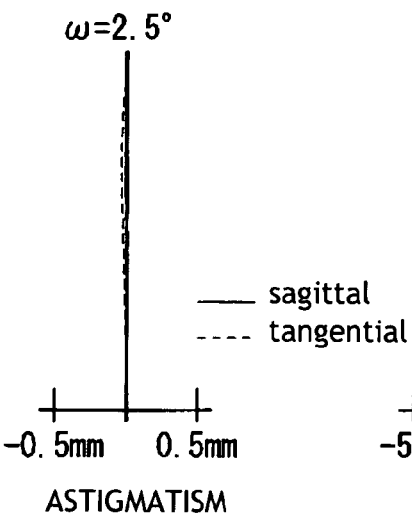
Figure 25C:
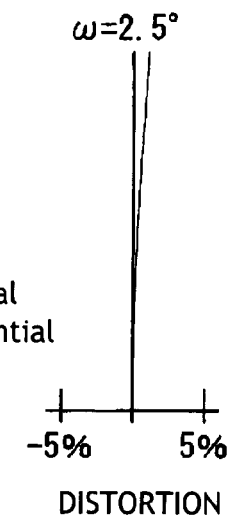
Figure 26A:
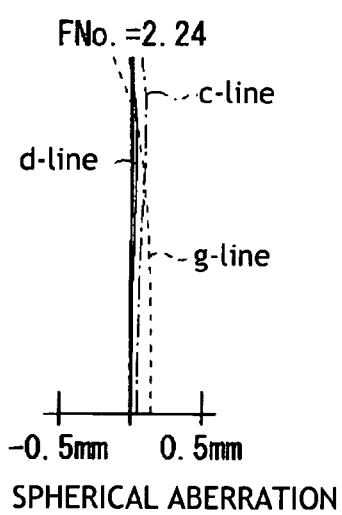
FIGS. 26A to 26C are aberration diagrams illustrating various aberrations at the telephoto end and at an object distance of 3 m in the zoom lens according to Example 1, and respectively show spherical aberration, astigmatism, and distortion.
Figure 26B:
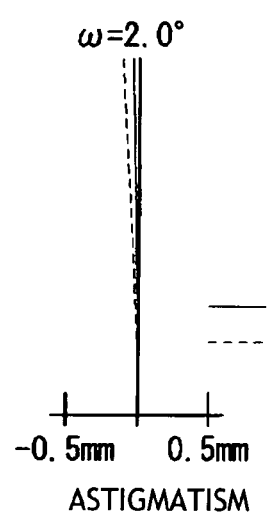
Figure 26C:
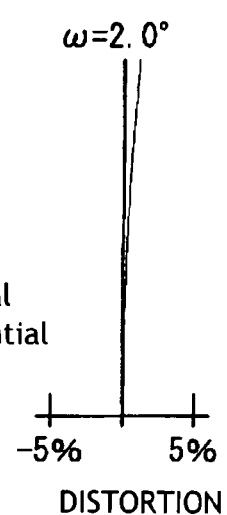
Figure 27A:
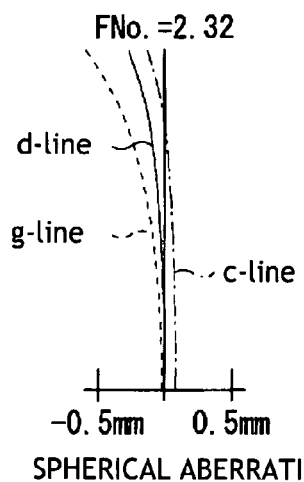
FIGS. 27A to 27C are aberration diagrams illustrating various aberrations at the telephoto end and at an object distance of 1.4 m in the zoom lens according to Example 1, and respectively show spherical aberration, astigmatism, and distortion.
Figure 27B:
Figure 27C:
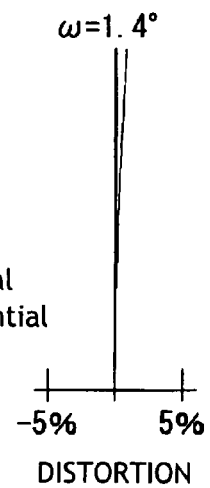
Figure 28A:
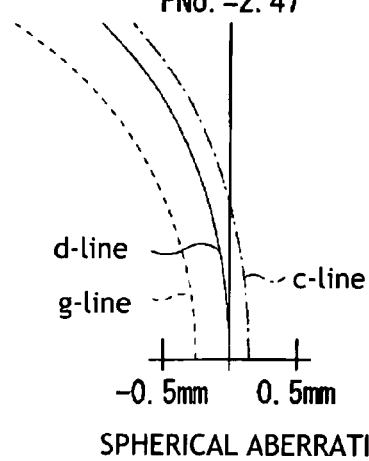
FIGS. 28A to 28C are aberration diagrams illustrating various aberrations at the telephoto end and at a closest object distance of 0.75 m in the zoom lens according to Example 1, and respectively show spherical aberration, astigmatism, and distortion.
Figure 28B:
Figure 28C:
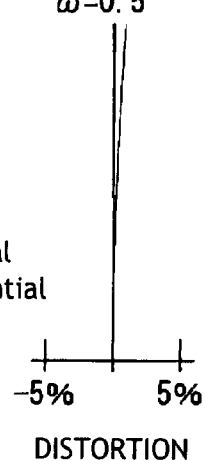

FIGS. 25A to 25C respectively show spherical aberration, astigmatism, and distortion with the zoom lens of Example 1 focusing on an infinitely distant object being at the telephoto end. In the respective aberration diagrams, aberrations are shown with using the d-line set as a reference wavelength. The spherical aberration diagram and the axial chromatic aberration diagram also show aberrations with respect to g-line (wavelength=435.8 nm) and c-line (wavelength=656.3 nm). In the astigmatism diagram, the solid line shows aberrations in the sagittal direction, and the broken line shows aberrations in the tangential direction. FNo. shows the F-number, and ω shows a half angle of field. Similarly, various aberrations when focusing is performed at an object distance of 3 m are shown in FIGS. 26A to 26C. Further, various aberrations when focusing is performed at an object distance of 1.4 m are shown in FIGS. 27A to 27C. Still further, various aberrations when focusing is performed at a closest focusing distance, i.e., a minimum object distance (M.O.D.), of 0.75 mm are shown in FIGS. 28A to 28C.

Figure 31A:
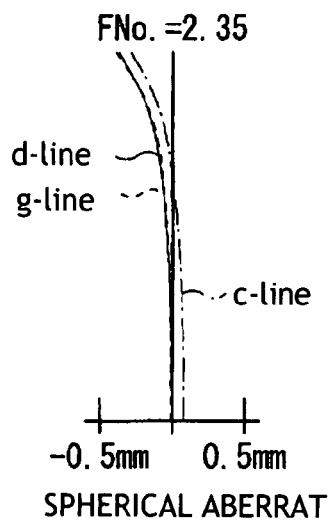
FIGS. 31A to 31C are aberration diagrams illustrating various aberrations at the telephoto end and at an object distance of 3.41 m in the zoom lens according to Example 2, and respectively show spherical aberration, astigmatism, and distortion.
Figure 31B:
Figure 31C:
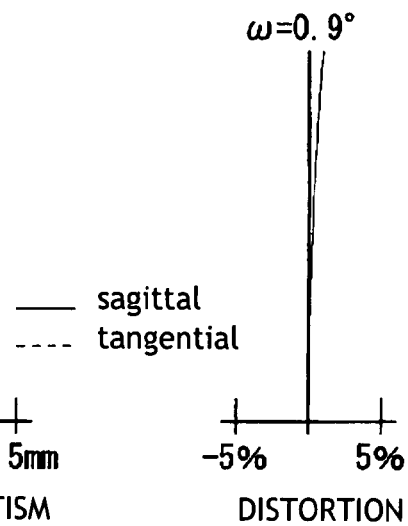
Figure 32A:
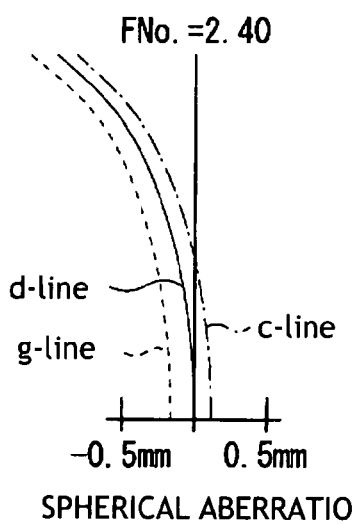
FIGS. 32A to 32C are aberration diagrams illustrating various aberrations at the telephoto end and at a closest object distance of 2.2 m in the zoom lens according to Example 2, and respectively show spherical aberration, astigmatism, and distortion.
Figure 32B:
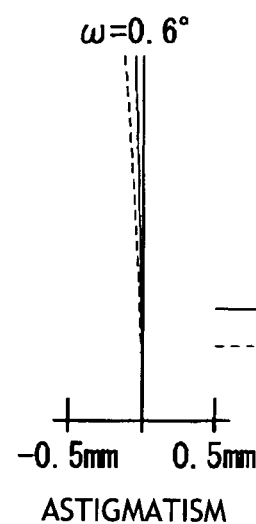
Figure 32C:
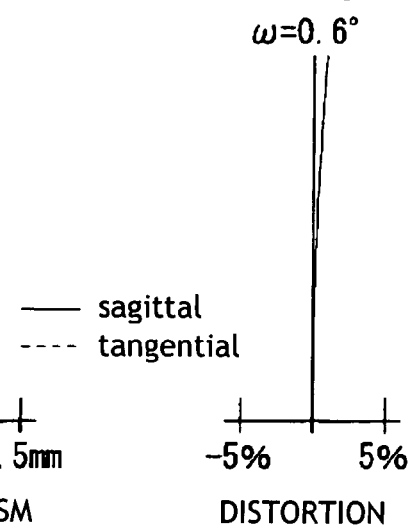

Similarly, FIGS. 29A to 29C show various aberrations with the zoom lens of Example 2 focusing on an infinitely distant object at the telephoto end. Similarly, various aberrations when focusing is performed at an object distance of 9.6 m are shown in FIGS. 30A to 30C. Further, various aberrations when focusing is performed at an object distance of 3.41 m are shown in FIGS. 31A to 31C. Still further, various aberrations when focusing is performed at a closest focusing distance, i.e., a minimum object distance (M.O.D.), of 2.2 mm are shown in FIGS. 32A to 32C.

Figure 33A:
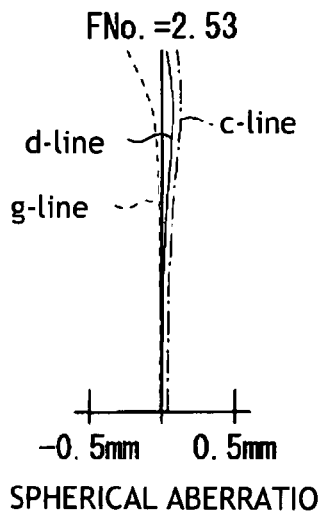
FIGS. 33A to 33C are aberration diagrams illustrating various aberrations at the telephoto end and at an object distance of infinity in the zoom lens according to Example 3, and respectively show spherical aberration, astigmatism, and distortion.
Figure 33B:
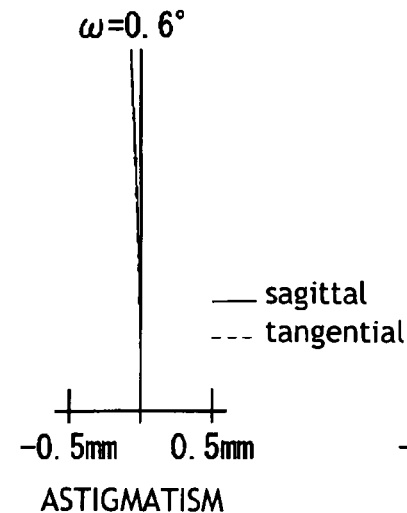
Figure 33C:
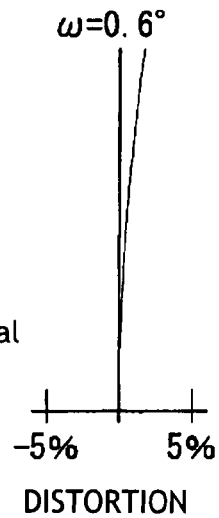
Figure 34A:
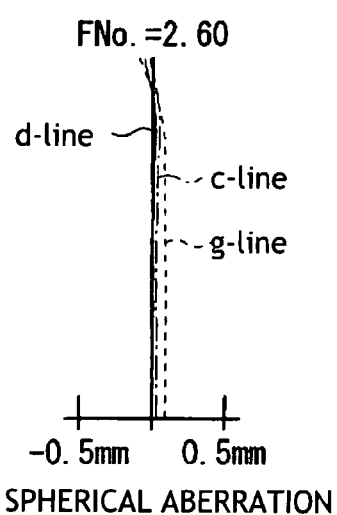
FIGS. 34A to 34C are aberration diagrams illustrating various aberrations at the telephoto end and at an object distance of 13.9 m in the zoom lens according to Example 3, and respectively show spherical aberration, astigmatism, and distortion.
Figure 34B:
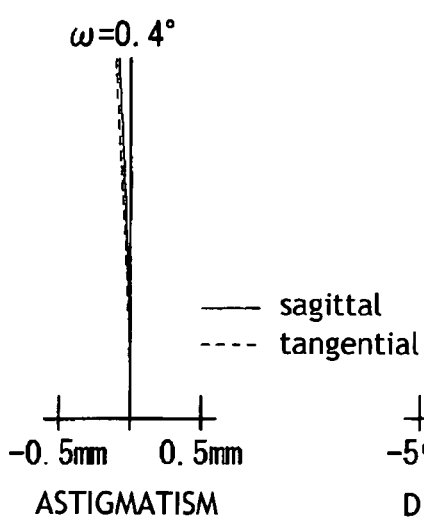
Figure 34C:
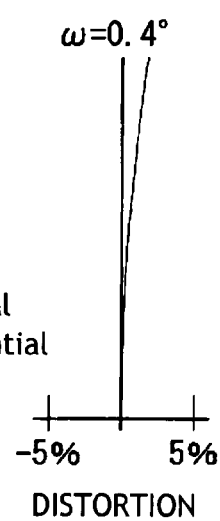
Figure 35A:
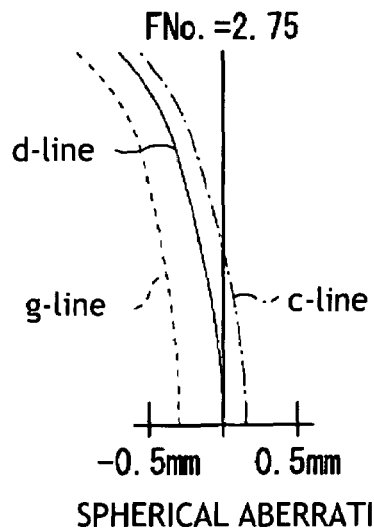
FIGS. 35A to 35C are aberration diagrams illustrating various aberrations at the telephoto end and at an object distance of 3.96 m in the zoom lens according to Example 3, and respectively show spherical aberration, astigmatism, and distortion.
Figure 35B:
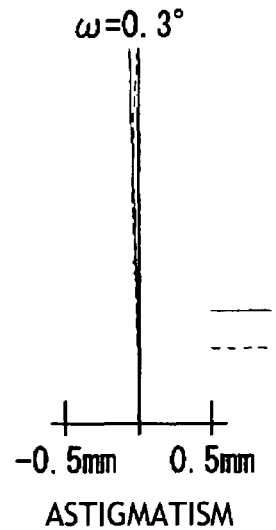
Figure 35C:
Figure 36A:
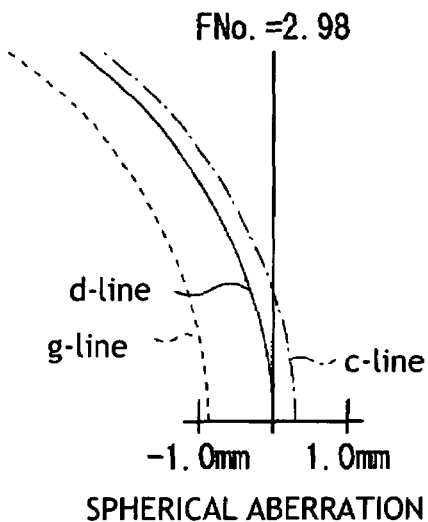
FIGS. 36A to 36C are aberration diagrams illustrating various aberrations at the telephoto end and at a closest object distance of 2.75 m in the zoom lens according to Example 3, and respectively show spherical aberration, astigmatism, and distortion.
Figure 36B:
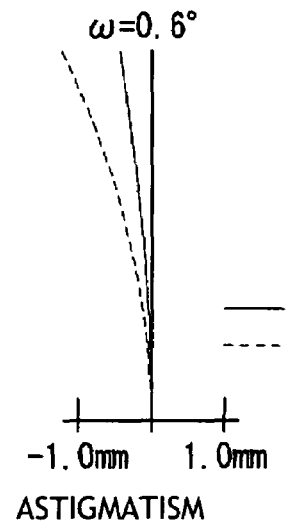
Figure 36C:
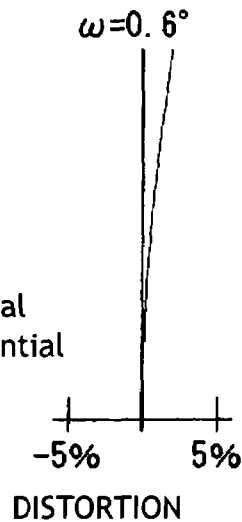

Similarly, FIGS. 33A to 33C show various aberrations with the zoom lens of Example 3 focusing on an infinitely distant object at the telephoto end. Similarly, various aberrations when focusing is performed at an object distance of 13.9 m are shown in FIGS. 34A to 34C. Further, various aberrations when focusing is performed at an object distance of 3.96 m are shown in FIGS. 35A to 35C. Still further, various aberrations when focusing is performed at a closest focusing distance, i.e., a minimum object distance (M.O.D.), of 2.75 mm are shown in FIGS. 36A to 36C.

Figure 37A:
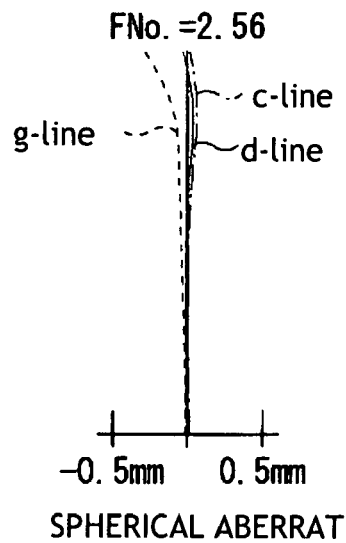
FIGS. 37A to 37C are aberration diagrams illustrating various aberrations at the telephoto end and at an object distance of infinity in the zoom lens according to Example 4, and respectively show spherical aberration, astigmatism, and distortion.
Figure 37B:
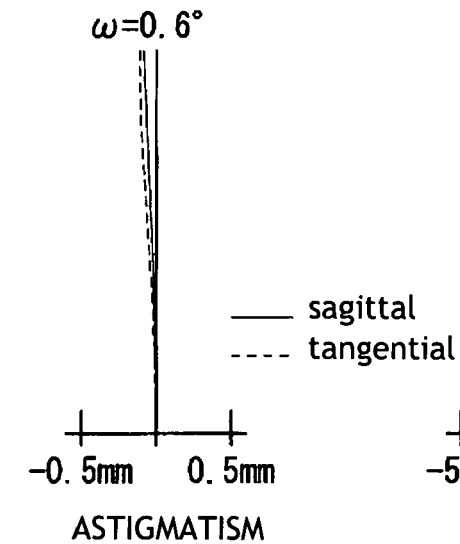
Figure 37C:
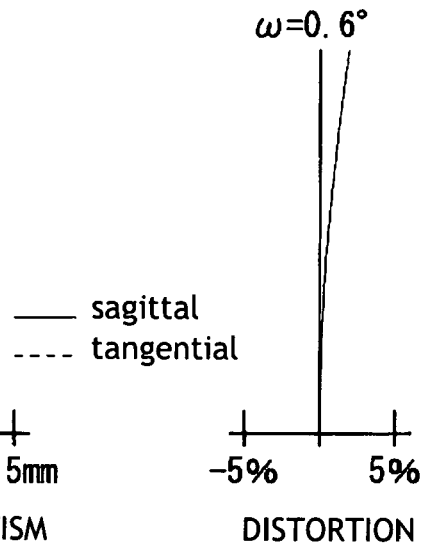
Figure 38A:
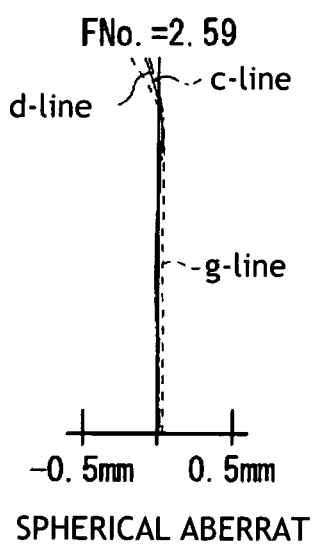
FIGS. 38A to 38C are aberration diagrams illustrating various aberrations at the telephoto end and at an object distance of 15.9 m in the zoom lens according to Example 4, and respectively show spherical aberration, astigmatism, and distortion.
Figure 38B:
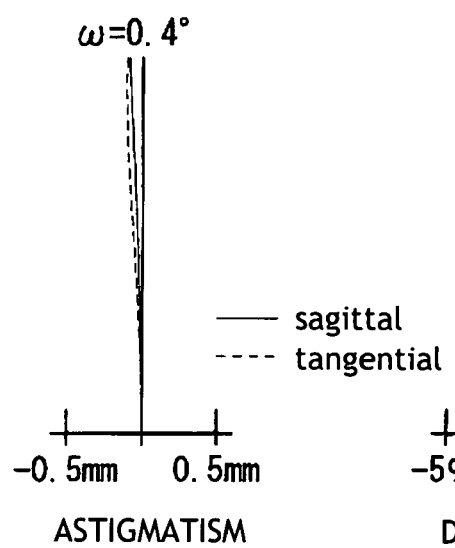
Figure 38C:
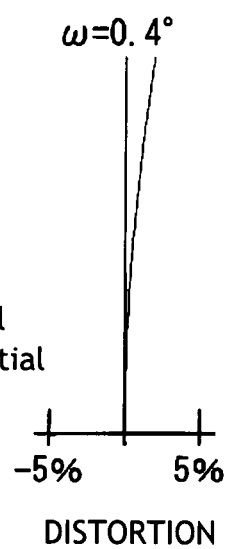
Figure 39A:
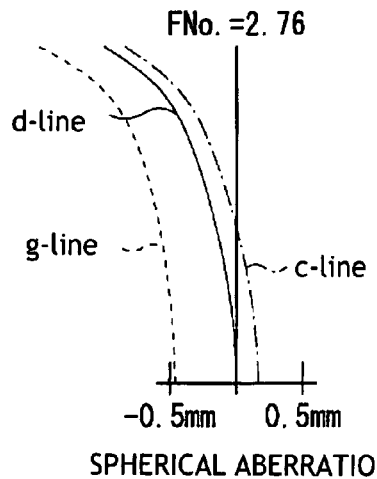
FIGS. 39A to 39C are aberration diagrams illustrating various aberrations at the telephoto end and at an object distance of 4.06 m in the zoom lens according to Example 4, and respectively show spherical aberration, astigmatism, and distortion.
Figure 39B:
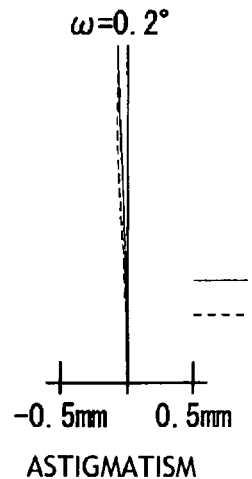
Figure 39C:
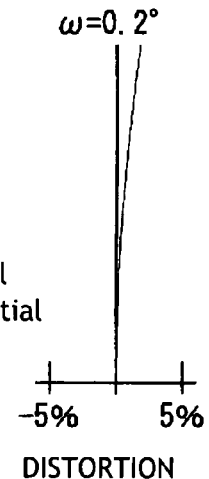
Figure 40A:
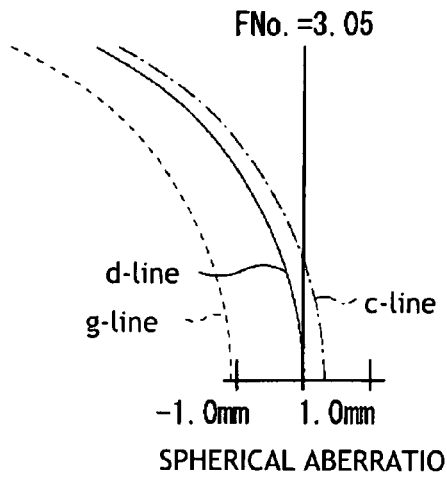
FIGS. 40A to 40C are aberration diagrams illustrating various aberrations at the telephoto end and at a closest object distance of 2.75 m in the zoom lens according to Example 4, and respectively show spherical aberration, astigmatism, and distortion.
Figure 40B:
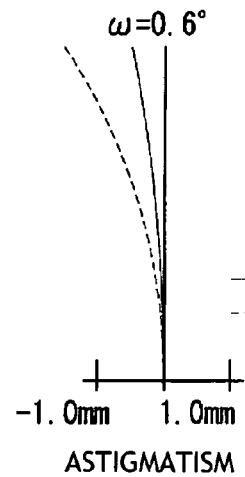
Figure 40C:
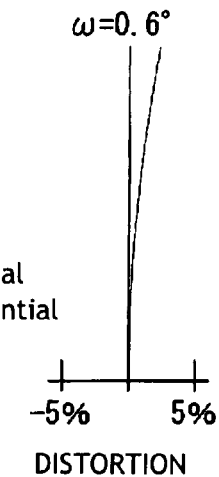

Similarly, FIGS. 37A to 37C show various aberrations with the zoom lens of Example 4 focusing on an infinitely distant object at the telephoto end. Similarly, various aberrations when focusing is performed at an object distance of 15.9 m are shown in FIGS. 38A to 38C. Further, various aberrations when focusing is performed at an object distance of 4.06 m are shown in FIGS. 39A to 39C. Still further, various aberrations when focusing is performed at a closest focusing distance, i.e., a minimum object distance (M.O.D.), of 2.75 mm are shown in FIGS. 40A to 40C.

Figure 41A:
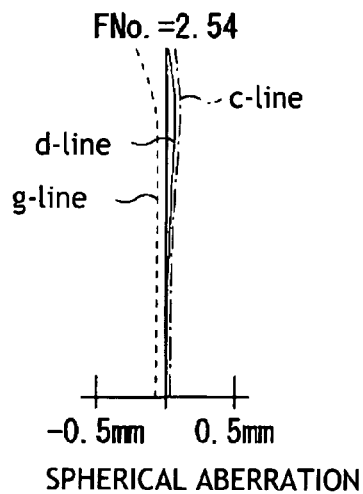
FIGS. 41A to 41C are aberration diagrams illustrating various aberrations at the telephoto end and at an object distance of infinity in the zoom lens according to Example 5, and respectively show spherical aberration, astigmatism, and distortion.
Figure 41B:
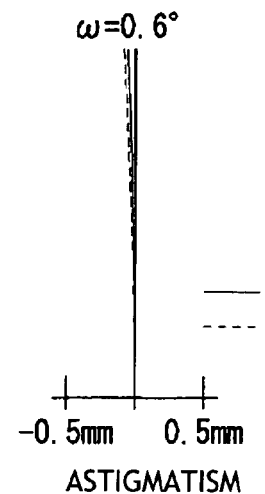
Figure 41C:
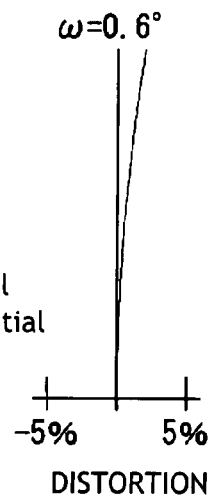
Figure 42A:
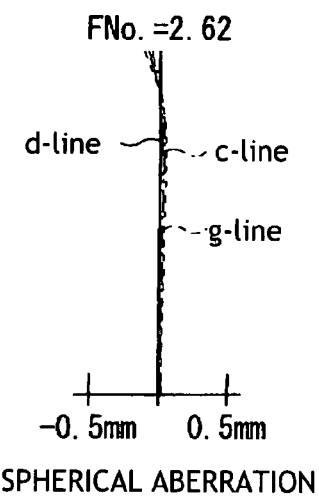
FIGS. 42A to 42C are aberration diagrams illustrating various aberrations at the telephoto end and at an object distance of 13.03 m in the zoom lens according to Example 5, and respectively show spherical aberration, astigmatism, and distortion.
Figure 42B:
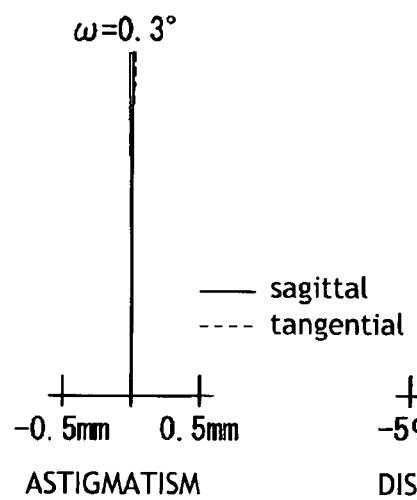
Figure 42C:
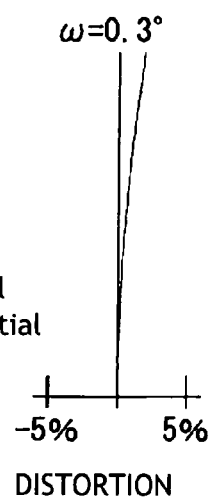
Figure 43A:
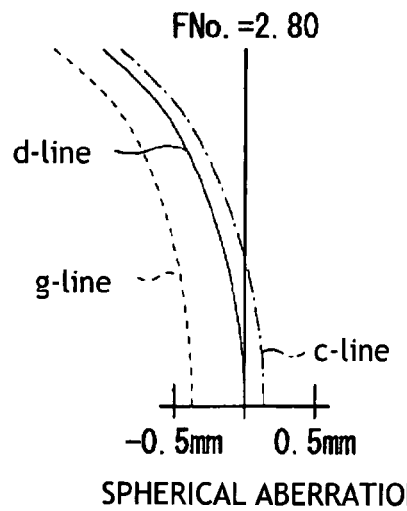
FIGS. 43A to 43C are aberration diagrams illustrating various aberrations at the telephoto end and at an object distance of 3.89 m in the zoom lens according to Example 5, and respectively show spherical aberration, astigmatism, and distortion.
Figure 43B:
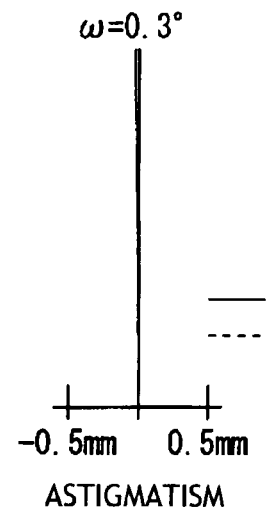
Figure 43C:
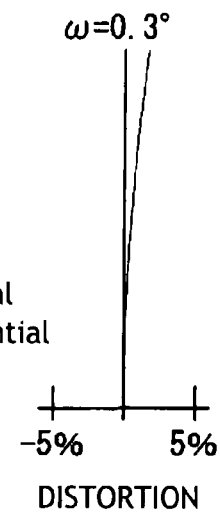
Figure 44A:
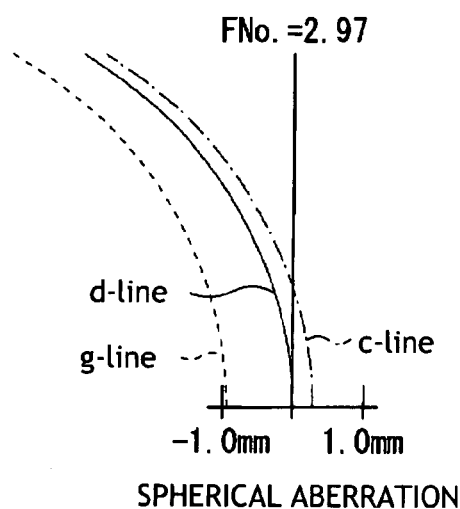
FIGS. 44A to 44C are aberration diagrams illustrating various aberrations at the telephoto end and at a closest object distance of 2.75 m in the zoom lens according to Example 5, and respectively show spherical aberration, astigmatism, and distortion.
Figure 44B:
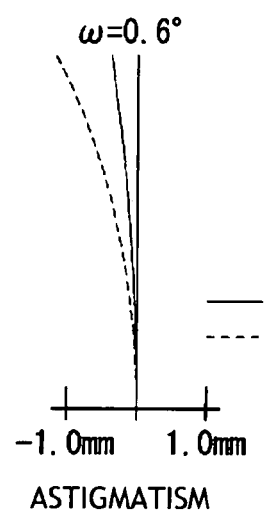
Figure 44C:
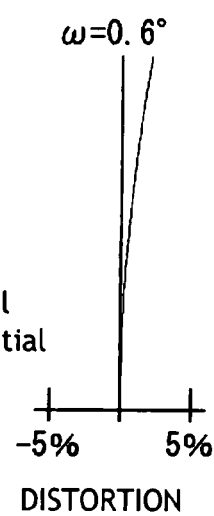

Similarly, FIGS. 41A to 41C show various aberrations with the zoom lens of Example 5 focusing on an infinitely distant object at the telephoto end. Similarly, various aberrations when focusing is performed at an object distance of 13.03 m are shown in FIGS. 42A to 42C. Further, various aberrations when focusing is performed at an object distance of 3.89 m are shown in FIGS. 43A to 43C. Still further, various aberrations when focusing is performed at a closest focusing distance, i.e., a minimum object distance (M.O.D.), of 2.75 mm are shown in FIGS. 44A to 44C.

As can be appreciated from the various numerical data and the various aberration diagrams, with respect to the various Examples, it is possible to realize large-aperture, high zoom-ratio zoom lenses in which variations of various aberrations during focusing are suppressed satisfactorily.

It is noted that the invention is not limited to the above-described embodiment and Examples and may be implemented with various modifications. For example, the values of the radius of curvature, the surface separation, and the refractive index of each lens component are not limited to the values shown in the above-described numerical examples and may assume other values. In addition, the invention is characterized by the configuration of the focusing group, in particular, and the zooming method itself is not limited to the examples described in the above-described embodiment.

What is claimed is:

1. A zoom lens comprising:

a variator group; and a focusing group disposed on an object side relative to the variator group, wherein:

the focusing group comprising, in order from the object side, a first group having a positive refractive power, a second group having a positive refractive power, and a third group having a positive refractive power, the first group comprises, in order from the object side, at least one concave lens and at least one convex lens, and when the zoom lens focuses from an infinitely distant object to a close object, the second group and the third group are moved with different amounts of movement.

2. The zoom lens according to claim 1, wherein when the zoom lens focuses, the second group and the third group are moved so that with respect to a change in an object distance, the amount of movement of the second group becomes large in a region near infinity, while the amount of movement of the third group becomes large in a close range.

3. The zoom lens according to claim 1, wherein:

when the zoom lens focuses, the second group and the third group are moved so that with respect to a change in an object distance, the amount of movement of the second group becomes large in a region near infinity, while the amount of movement of the third group becomes large in a close range, and the second group and the third group are moved so as to satisfy the following relation in a range of $0 \leq X2 \leq Z2/2$ $$|X3/Z3| \leq 0.14 \tag{1}$$

where Z2 and Z3 denote the amounts of movement of the second and third groups during the closest focusing, respectively, and X2 and X3 denote the amounts of movement of the second and third groups during focusing on an arbitrary finite object including an infinitely distant object, respectively.

4. The zoom lens according to claim 1, wherein:

when the zoom lens focuses, the second group and the third group are moved so that with respect to a change in an object distance, the amount of movement of the second group becomes large in a region near infinity, while the amount of movement of the third group becomes large in a close range, and the second group and the third group are moved so as to satisfy the following relation in a range of $Z3/2 \leq Y3 \leq Z3$ $$|(Z2-Y2)/Z2| \leq 0.05 \tag{2}$$

where Z2 and Z3 denote the amounts of movement of the second and third groups during the closest focusing, respectively, and Y2 and Y3 denote the amounts of movement of the second and third groups during focusing on an arbitrary finite object including the closest object, respectively.

5. The zoom lens according to claim 1, wherein:

when the zoom lens focuses, the second group and the third group are moved so that with respect to a change in an object distance, the amount of movement of the second group becomes large in a region near infinity, while the amount of movement of the third group becomes large in a close range, the second group and the third group are moved so as to satisfy the following relation in a range of $0 \leq X2 \leq Z2/2$ $$|X3/Z3| \leq 0.14 \tag{1}$$

where Z2 and Z3 denote the amounts of movement of the second and third groups during the closest focusing, respectively, and X2 and X3 denote the amounts of movement of the second and third groups during focusing on an arbitrary finite object including an infinitely distant object, respectively, and the second group and the third group are moved so as to satisfy the following relation in a range of $Z3/2 \leq Y3 \leq Z3$ $$|(Z2-Y2)/Z2| \leq 0.05 \tag{2}$$

where Z2 and Z3 denote the amounts of movement of the second and third groups during the closest focusing, respectively, and Y2 and Y3 denote the amounts of movement of the second and third groups during focusing on an arbitrary finite object including the closest object, respectively.

6. An image pickup apparatus comprising:

the zoom lens according to claim 1, wherein:

when the zoom lens focuses, the second group and the third group are moved so that with respect to a change in an object distance, the amount of movement of the second group becomes large in a region near infinity, while the amount of movement of the third group becomes large in a close range.

7. An image pickup apparatus comprising:

the zoom lens according to claim 1, wherein:

when the zoom lens focuses, the second group and the third group are moved so that with respect to a change in an object distance, the amount of movement of the second group becomes large in a region near infinity, while the amount of movement of the third group becomes large in a close range, the second group and the third group are moved so as to satisfy the following relation in a range of $0 \leq X2 \leq Z2/2$ $$|X3/Z3| \leq 0.14 \tag{1}$$

where Z2 and Z3 denote the amounts of movement of the second and third groups during the closest focusing, respectively, and X2 and X3 denote the amounts of movement of the second and third groups during focusing on an arbitrary finite object including an infinitely distant object, respectively, and the second group and the third group are moved so as to satisfy the following relation in a range of $Z3/2 \leq Y3 \leq Z3$ $$|(Z2-Y2)/Z2| \leq 0.05 \tag{2}$$

where Z2 and Z3 denote the amounts of movement of the second and third groups during the closest focusing, respectively, and Y2 and Y3 denote the amounts of movement of the second and third groups during focusing on an arbitrary finite object including the closest object, respectively.

8. A zoom lens comprising:

a variator group; and a focusing group disposed on an object side relative to the variator group, wherein:

the focusing group comprising, in order from the object side, a first group having a positive refractive power, a second group having a positive refractive power, and a third group having a positive refractive power, the first group comprises, in order from the object side, at least one concave lens and at least one convex lens, when the zoom lens focuses from an infinitely distant object to a close object, the second group and the third group are moved with different amounts of movement, and the following conditional expressions are satisfied $$0.013 \leq \phi1/\phi F \leq 0.15 \quad (3)$$

$$0.36 \leq \phi2/\phi F \leq 0.65 \quad (4)$$

$$0.74 \leq \phi2/\phi3 \leq 1.60 \quad (5)$$

where $\phi F$ denotes a refractive power of the whole focusing group, and $\phi1$, $\phi2$, and $\phi3$ denote the refractive powers of the first group, the second group, and the third group, respectively.

9. The zoom lens according to claim 8, wherein the second group and the third group are moved so as to satisfy the following relation in a range of $0 \leq X2 \leq Z2/2$ $$|X3/Z3| \leq 0.14 \quad (1)$$

where Z2 and Z3 denote the amounts of movement of the second and third groups during the closest focusing, respectively, and X2 and X3 denote the amounts of movement of the second and third groups during focusing on an arbitrary finite object including an infinitely distant object, respectively.

10. The zoom lens according to claim 8, wherein the second group and the third group are moved so as to satisfy the following relation in a range of $Z3/2 \leq Y3 \leq Z3$ $$|(Z2-Y2)/Z2| \leq 0.05 \quad (2)$$

where Z2 and Z3 denote the amounts of movement of the second and third groups during the closest focusing, respectively, and Y2 and Y3 denote the amounts of movement of the second and third groups during focusing on an arbitrary finite object including the closest object, respectively.

11. The zoom lens according to claim 8, wherein:

the second group and the third group are moved so as to satisfy the following relation in a range of $0 \leq X2 \leq Z2/2$ $$|X3/Z3| \leq 0.14 \quad (1)$$

where Z2 and Z3 denote the amounts of movement of the second and third groups during the closest focusing, respectively, and X2 and X3 denote the amounts of movement of the second and third groups during focusing on an arbitrary finite object including an infinitely distant object, respectively, and the second group and the third group are moved so as to satisfy the following relation in a range of $Z3/2 \leq Y3 \leq Z3$ $$|(Z2-Y2)/Z2| \leq 0.05 \quad (2)$$

where Z2 and Z3 denote the amounts of movement of the second and third groups during the closest focusing, respectively, and Y2 and Y3 denote the amounts of movement of the second and third groups during focusing on an arbitrary finite object including the closest object, respectively.

12. An image pickup apparatus comprising the zoom lens according to claim 8.

13. An image pickup apparatus comprising:

the zoom lens according to claim 8, wherein:

the second group and the third group are moved so as to satisfy the following relation in a range of $0 \leq X2 \leq Z2/2$ $$|X3/Z3| \leq 0.14 \quad (1)$$

where Z2 and Z3 denote the amounts of movement of the second and third groups during the closest focusing, respectively, and X2 and X3 denote the amounts of movement of the second and third groups during focusing on an arbitrary finite object including an infinitely distant object, respectively, and the second group and the third group are moved so as to satisfy the following relation in a range of $Z3/2 \leq Y3 \leq Z3$ $$|(Z2-Y2)/Z2| \leq 0.05 \quad (2)$$

where Z2 and Z3 denote the amounts of movement of the second and third groups during the closest focusing, respectively, and Y2 and Y3 denote the amounts of movement of the second and third groups during focusing on an arbitrary finite object including the closest object, respectively.

14. A zoom lens comprising:

a variator group; and a focusing group disposed on an object side relative to the variator group, wherein:

the focusing group comprising, in order from the object side, a first group having a positive refractive power, a second group having a positive refractive power, and a third group having a positive refractive power, the first group comprises, in order from the object side, at least one concave lens and at least one convex lens, when the zoom lens focuses from an infinitely distant object to a close object, the second group and the third group are moved with different amounts of movement, and the concave lens is made of a lens material which is in a range that satisfies all of the following inequalities (6) to (8):

$$Nd1 \geq 0.014 vd1 + 1.22 \text{ (where } vd1 \geq 40) \quad (6)$$

$$Nd1 \geq 0.00267 vd1 + 1.673 \text{ (where } vd1 \leq 40) \quad (7)$$

$$Nd1 \leq 0.052 vd1 + 0.44 \quad (8)$$

where Nd1 denotes a refractive index of the concave lens of the first group with respect to d line, and vd1 denotes Abbe number of the concave lens of the first group.

15. The zoom lens according to claim 14, wherein the second group and the third group are moved so as to satisfy the following relation in a range of $0 \leq X2 \leq Z2/2$ $$|X3/Z3| \leq 0.14 \tag{1}$$

where Z2 and Z3 denote the amounts of movement of the second and third groups during the closest focusing, respectively, and X2 and X3 denote the amounts of movement of the second and third groups during focusing on an arbitrary finite object including an infinitely distant object, respectively.

16. The zoom lens according to claim 14, wherein the second group and the third group are moved so as to satisfy the following relation in a range of $Z3/2 \leq Y3 \leq Z3$ $$|(Z2-Y2)/Z2| \leq 0.05 \tag{2}$$

where Z2 and Z3 denote the amounts of movement of the second and third groups during the closest focusing, respectively, and Y2 and Y3 denote the amounts of movement of the second and third groups during focusing on an arbitrary finite object including the closest object, respectively.

17. The zoom lens according to claim 14, wherein:

the second group and the third group are moved so as to satisfy the following relation in a range of $0 \leq X2 \leq Z2/2$ $$|X3/Z3| \leq 0.14 \tag{1}$$

where Z2 and Z3 denote the amounts of movement of the second and third groups during the closest focusing, respectively, and X2 and X3 denote the amounts of movement of the second and third groups during focusing on an arbitrary finite object including an infinitely distant object, respectively, and the second group and the third group are moved so as to satisfy the following relation in a range of $Z3/2 \leq Y3 \leq Z3$ $$|(Z2-Y2)/Z2| \leq 0.05 \tag{2}$$

where Z2 and Z3 denote the amounts of movement of the second and third groups during the closest focusing, respectively, and Y2 and Y3 denote the amounts of movement of the second and third groups during focusing on an arbitrary finite object including the closest object, respectively.

18. The zoom lens according to claim 14, wherein the following conditional expressions are satisfied $$0.013 \leq \phi1/\phi F \leq 0.15 \tag{3}$$

$$0.36 \leq \phi2/\phi F \leq 0.65 \tag{4}$$

$$0.74 \leq \phi2/\phi3 \leq 1.60 \tag{5}$$

where φF denotes a refractive power of the whole focusing group, and

φ1, φ2, and φ3 denote the refractive powers of the first group, the second group, and the third group, respectively.

19. The zoom lens according to claim 14, wherein:

the second group and the third group are moved so as to satisfy the following relation in a range of $0 \leq X2 \leq Z2/2$ $$|X3/Z3| \leq 0.14 \tag{1}$$

where Z2 and Z3 denote the amounts of movement of the second and third groups during the closest focusing, respectively, and X2 and X3 denote the amounts of movement of the second and third groups during focusing on an arbitrary finite object including an infinitely distant object, respectively, the second group and the third group are moved so as to satisfy the following relation in a range of $Z3/2 \leq Y3 \leq Z3$ $$|(Z2-Y2)/Z2| \leq 0.05 \tag{2}$$

where Z2 and Z3 denote the amounts of movement of the second and third groups during the closest focusing, respectively, and Y2 and Y3 denote the amounts of movement of the second and third groups during focusing on an arbitrary finite object including the closest object, respectively, and the following conditional expressions are satisfied $$0.013 \leq \phi1/\phi F \leq 0.15 \tag{3}$$

$$0.36 \leq \phi2/\phi F \leq 0.65 \tag{4}$$

$$0.74 \leq \phi2/\phi3 \leq 1.60 \tag{5}$$

where φF denotes a refractive power of the whole focusing group, and

φ1, φ2, and φ3 denote the refractive powers of the first group, the second group, and the third group, respectively.

20. An image pickup apparatus comprising the zoom lens according to claim 14.

21. An image pickup apparatus comprising:

the zoom lens according to claim 14, wherein:

the second group and the third group are moved so as to satisfy the following relation in a range of $0 \leq X2 \leq Z2/2$ $$|X3/Z3| \leq 0.14 \tag{1}$$

where Z2 and Z3 denote the amounts of movement of the second and third groups during the closest focusing, respectively, and X2 and X3 denote the amounts of movement of the second and third groups during focusing on an arbitrary finite object including an infinitely distant object, respectively, and the second group and the third group are moved so as to satisfy the following relation in a range of $Z3/2 \leq Y3 \leq Z3$ $$|(Z2-Y2)/Z2| \leq 0.05 \tag{2}$$

where Z2 and Z3 denote the amounts of movement of the second and third groups during the closest focusing, respectively, and Y2 and Y3 denote the amounts of movement of the second and third groups during focusing on an arbitrary finite object including the closest object, respectively.

* * * * *